Sept. 8, 1953 C. G. PULLIN 2,651,480

MULTIPLE ROTOR HELICOPTER

Filed July 29, 1946 15 Sheets-Sheet 1

INVENTOR
Cyril George Pullin
BY Synnestvedt & Lechner
ATTORNEYS

INVENTOR
Cyril George Pullin
BY
Lyon, Lyon & Lechner
ATTORNEYS

Sept. 8, 1953 C. G. PULLIN 2,651,480

MULTIPLE ROTOR HELICOPTER

Filed July 29, 1946 15 Sheets-Sheet 3

INVENTOR
Cyril George Pullin
BY Symmestvedt & Lechner
ATTORNEYS

INVENTOR
Cyril George Pullin
BY Synnestvedt & Lechner
ATTORNEYS

INVENTOR
Cyril George Pullin
BY Symmestvedt & Lechner
ATTORNEYS

INVENTOR
Cyril George Pullin
BY
ATTORNEYS

Sept. 8, 1953 C. G. PULLIN 2,651,480

MULTIPLE ROTOR HELICOPTER

Filed July 29, 1946 15 Sheets-Sheet 7

INVENTOR
Cyril George Pullin
BY [signature]
ATTORNEYS

Sept. 8, 1953 C. G. PULLIN 2,651,480

MULTIPLE ROTOR HELICOPTER

Filed July 29, 1946 15 Sheets-Sheet 8

INVENTOR
Cyril George Pullin
BY Sylvester & Pochner
ATTORNEYS

INVENTOR
Cyril George Pullin
BY Synnestvedt & Lechner
ATTORNEYS

INVENTOR
Cyril George Pullin
BY Synnestvedt & Lechner
ATTORNEYS

INVENTOR
Cyril George Pullin
BY Synnestvedt & Lechner
ATTORNEYS

MULTIPLE ROTOR HELICOPTER

Filed July 29, 1946 15 Sheets-Sheet 12

INVENTOR
Cyril George Pullin
BY Symestvedt & Lechner
ATTORNEYS

INVENTOR
Cyril George Pullin
BY Sylvester & Lechner
ATTORNEYS

Sept. 8, 1953 C. G. PULLIN 2,651,480

MULTIPLE ROTOR HELICOPTER

Filed July 29, 1946 15 Sheets-Sheet 14

INVENTOR
Cyril George Pullin
BY Synnestvedt & Lechner
ATTORNEYS

Sept. 8, 1953 C. G. PULLIN 2,651,480

MULTIPLE ROTOR HELICOPTER

Filed July 29, 1946 15 Sheets-Sheet 15

INVENTOR
C. G. Pullin
BY
Symmestvedt & Lechner
ATTORNEYS

Patented Sept. 8, 1953

2,651,480

UNITED STATES PATENT OFFICE 2,651,480

MULTIPLE ROTOR HELICOPTER

Cyril George Pullin, Tadburn, Ampfield, Hampshire, England, assignor, by mesne assignments, to Autogiro Company of America, Philadelphia, Pa., a corporation of Delaware Application July 29, 1946, Serial No. 686,873
In Great Britain August 1, 1945

10 Claims. (Cl. 244—17.23)

This invention relates to helicopters having multiple lifting rotors; the invention being especially concerned with helicopters capable of lifting and transporting heavy loads.

A considerable variety of multi-rotor configurations have already been proposed, few of which have achieved any practical success. Among the considerations urged for adopting multiple rotor arrangements has been a supposed need to minimise the diameter of individual rotors for structural and mechanical reasons; and multiple rotors have also been advocated as providing in part at least a solution of control problems.

The introduction of articulated (i. e. flapping) blades and direct control, i. e. control by shifting the resultant lift line of the rotor (e. g. by direct mechanical coupling of a movable rotor axle to the controls, or by aerodynamic servo-action, such as cyclic pitch variation), both features now being common practice, has overcome some of the problems of constructing large rotors and has provided a solution of control problems satisfactory for many purposes.

Multiple rotors have also been proposed as a solution of the torque balance problem. The torque reaction of a single rotor can, however, be satisfactorily compensated by an auxiliary rotor or equivalent means for producing a thrust in the yawing plane offset from the main rotor axis and this is now conventional practice.

The only arrangements with more than one lifting rotor which have found much favour in recent practice are provided with twin rotors arranged side-by-side laterally of the machine, but such an arrangement has the same fore and aft stability characteristics as a single rotor arrangement, whose stability in hovering and low-speed forward flight is not entirely satisfactory.

The main object of this invention is the provision of a helicopter having a rotor arrangement which is especially advantageous for performing the duty of lifting and transporting the maximum possible useful load for the power expended, more especially when level speed performance is not of primary importance.

A further object is the provision of a helicopter whose control and stability characteristics are substantially indifferent to its direction of horizontal travel. Among the specific purposes to which such an aircraft can be put are:

(*a*). As an "Air Truck" for the transport of goods at a speed and cost intermediate between those of road transport and fixed wing cargo aircraft;

(*b*). Weight handling in engineering works and projects of various kinds, especially in circumstances which present formidable obstacles to the use of conventional handling methods;

(*c*). As a substitute for surface transportation where the latter is not available and in other appropriate circumstances, e. g. when surface transportation would call for civil engineering work of prohibitive cost;

(*d*). All purposes involving distribution of material evenly over a large area, e. g. crop dusting or spraying, soil or water disinfection, seed-sowing, distribution of oil on a water area for calming heavy seas and other like purposes connected with agriculture and fisheries;

(*e*). Generally, all kinds of duties requiring the lifting or transportation of heavy loads to, from, or over places where the use of surface transport would be impossible, dangerous, difficult or otherwise inadvisable or inadmissible.

The invention broadly consists in providing a helicopter with three lifting rotors which contribute substantially equally to the total lift and whose centres are disposed at the vertices of a substantially horizontal acute-angled triangle.

Preferably, the three rotors are of substantially equal diameter, and are driven at the same speed by a common power plant, which may incorporate a central distributive gear box with three output shafts connected respectively to the three rotors by substantially identical transmission assemblies.

Such a three-rotor helicopter is peculiarly appropriate to the heavy duties hereinbefore referred to for which purposes it possesses outstanding advantages, such as—

(1). It can afford complete dynamic stability about all horizontal axes with adequate damping, especially in hovering flight. The magnitude of the damping moment depends primarily on the mutual spacing of the lift lines of the several rotors; and the least number of rotors, whose lift is of the same order, giving damping moments of the same order about all horizontal axes, is three. It is to be noted that the dynamic stability thus obtained is not dependent, as in single rotor arrangements, on offsetting the flapping pivots of individual rotor blades from the rotor axis, so that offset flapping pivots may be dispensed with.

Further, the stability, both static and dynamic, is also adequate in forward flight, including flight at low forward speeds, the latter being the worst condition for stability of a single (or laterally side-by-side twin) rotor arrangement.

(2). The substantially equal distribution of lift between the three rotors is favorable for obtaining a good powerweight ratio of the unloaded aircraft, thereby increasing the useful load capacity. The weight saving is mainly in the weight of the rotors and transmission elements, on account of the cube/square law, according to which, the total weight of the rotors and their transmissions tends to be inversely proportional to the square root of the number of rotors (of substantially identical dimensions and characteristics) between which a given load is distributed.

(3). Important economies are obtainable in the weight of the fixed structure of which every important part can be utilised for carrying essential or useful loads, which can be so distributed as to minimise bending moments in the rotor-supporting outrigger structures.

(4). The possibility of dispensing with offset flapping pivots (see advantage (1) above) opens up the further possibility of using two-bladed rotors in appropriate circumstances, enabling further weight economy and increased aerodynamic efficiency (of the rotors) to be achieved. The main objection to two-bladed rotors is that the first harmonic of flapping oscillation gives rise to an oscillating moment which is transmitted to the fixed structure, and whose frequency is twice per revolution of the rotor, when the flapping pivots are offset. With no flapping pivot offset this oscillatory moment disappears. Oscillatory moments generated by the second harmonic of the flapping oscillation becomes serious only when the "tip speed ratio" (conventionally symbolised as $V/R\Omega$) is relatively high; and for a helicopter for which a high level speed is not a design requirement, these second harmonic oscillations will not seriously affect the smoothness of operation of the rotors.

(5). The three-rotor arrangement is favourable to structural arrangements which will conveniently accommodate, without excessive weight penalty, an undercarriage having a very extended vertical travel. A helicopter whose duties call for much of its flying to be done near the ground requires an undercarriage capable of ensuring a safe landing in the case of engine failure at very low altitudes. In such circumstances landing must necessarily be effected at the vertical speed of vertical auto-rotative descent, which speed may be excessively high according to conventional standards, and this calls for the provision of an under-carriage capable of a very extended shock-absorbing travel.

(6). Powerful control about all axes is obtainable (i. e. large values of the quotient, control moment/moment of inertia), on account of the large horizontal spacing of the lift lines of the several rotors.

The swept discs of the three rotors are preferably non-overlapping, partly because overlap reduces effective disc area, and partly on account of oscillatory interference between partially overlapping rotors, which generates vibratory forces and couples. However, when the need for minimising overall dimensions is paramount, overlapping or intermeshing rotors may, in spite of the above-mentioned defects, represent the best compromise for meeting the requirements.

Notwithstanding the advantage, in respect of reduced uncompensated torque reaction, obtained by having two of the rotors rotating in opposite directions, it is preferred to have all the rotors rotate in the same direction, since the above-mentioned advantage is more apparent than real; because, at least when using the proposed methods, hereinafter described, it is as easy to compensate the torque reactions of all three rotors as of one, which must be compensated in any case, and the preferred arrangement is much more advantageous in other respects; for instance, the need for right- and left-handed rotor blades, hubs and transmission assemblies is avoided, and a symmetrical distributive gearbox can be provided.

An important part of this invention relates to the control of a three-rotor helicopter as described above. This provides for control of the aircraft in pitch and roll by differential collective pitch control of the three rotors. By "collective pitch control" is meant controllably varying the pitch angles of all the blades of a rotor simultaneously by an equal amount, the increment or decrement of pitch angle being independent of the instantaneous positions of the blades in azimuth. Similarly, "collective pitch angle" means the instantaneous average pitch angle of all the blades of a rotor, or the mean pitch angle of any one blade averaged over a complete revolution. The "differential" control establishes differences of collective pitch angle between the several rotors, thereby establishing corresponding differences of lift; these give rise to a control couple which acts on the airframe in a vertical plane and which may be a pitching couple, a rolling couple, or a combined pitching and rolling couple, according to the values of the (positive or negative) collective pitch increments applied to the several rotors; and the collective pitch varying means of the several rotors are connected to the control circuits, so that the required control response is obtained when the appropriate control movements for pitching and rolling are executed. Usually separate control circuits for pitching and rolling control will be provided, being appropriately connected to the collective pitch varying means of the three rotors. The pitching and rolling control circuits may be operated by a common control column of the conventional kind or by separate control members when used for trimming; or the separate trimming control members may be connected to the control circuits operated by a common control column so as to act as "variable datum" controls for pitching and rolling respectively.

In a preferred form of the helicopter of this invention, one of the three rotors is centered in the fore and aft plane of symmetry of the helicopter and the other two are symmetrically disposed on either side of the plane of symmetry.

The pitching control then operates by applying equal variations of the same algebraic sign to the collective pitch angles of the two side-by-side rotors and a variation of opposite sign to the collective pitch angle of the third rotor; and the rolling control operates by applying equal and opposite variations of collective pitch angle to the said side-by-side rotors.

For control in yaw the principle of cyclic pitch control is employed in which a cyclic or oscillatory variation of pitch angle of frequency once per revolution and of variable amplitude is applied to the rotor blades. When applied to a "flapping" rotor the result is that the lift vector is tilted through an angle substantially equal to the half-amplitude of the applied cyclic-pitch angle variation, causing an increase, proportional to the amplitude of applied cyclic pitch variation, of the horizontal component of the lift, in the direction advanced 90° (in the direction of rotation of the rotor) from the minimum phase of the applied cyclic pitch angle variation. Since all the rotors of the three-rotor arrangement considered are horizontally displaced from the c. g. of the aircraft, a variation of the horizontal component of the lift reaction of any one of the rotors in any direction other than that of the line joining the c. g. and the centre of that rotor can be used for controlling the aircraft in yaw; and it is important to note that for this purpose the phase of cyclic pitch angle variation remains constant, and only the amplitude has to be varied by the yawing control.

In applying this form of yawing control to the preferred arrangement with one rotor in the fore and aft plane of symmetry and the other two rotors symmetrically disposed on either side of this plane, the yawing control is preferably effected by differential cyclic pitch control of the two side-by-side rotors, so applied as to produce differential inclinations in the fore and aft direction of the lift vectors of these two rotors. The control operates by applying cyclic pitch angle variations of opposite sign and of variable equal amplitude to the two rotors, the zero phase being in the fore and aft plane.

In addition to the differential collective pitch controls for pitching and rolling control of the helicopter, the collective pitch angles of all three rotors can be increased or decreased simultaneously by means of an independent control circuit with its own control member—corresponding to the (collective) "pitch control lever" of a conventional single-rotor helicopter, and serving the same purposes.

Compensation of torque reaction is obtained by means of "built-in" inclinations to the vertical of the (mechanical) axes of all three rotors in directions tangential of the circle containing the centres of the rotors, these inclinations of the several rotor axes preferably being cyclically symmetrical with respect to the centre of said circle, which coincides approximately with the vertical projection on said circle of the c. g. of the helicopter. The large lever arms about the c. g., at which the horizontal forces introduced by these inclinations of the axes act, enable the torque reaction to be compensated by relatively moderate inclinations, even when all three rotors rotate in the same sense, so that, as already stated, the need for counter-rotating a pair of the rotors—with the attendant drawbacks of this arrangement—merely to decrease the torque reaction to be compensated, disappears.

The (mechanical) axes of the rotors may also be given "built-in" inclinations to the vertical in directions radial of the circle containing the rotor centres, i. e. at right angles to the inclinations mentioned in the preceding paragraph. Such radial inclinations are of course vectorially additive to the tangential inclinations. The mutual inclinations of the several rotor axes, when projected on to the fore and aft and transverse planes of the aircraft respectively, constitute longitudinal and lateral "dihedral angles," which are mainly due to the radial components of the inclinations. The tangential components of inclination only contribute to the dihedral angles, if they are unsymmetrical. If equal, cyclically symmetrical, tangential inclinations alone are present, these dihedral angles are zero. The longitudinal and lateral dihedral angles (which may be considered "positive" or "negative" according as the projections of the axes on the said planes meet above or below the rotors) constitute design parameters which can be independently varied by the designer at will, by selecting the radial inclinations of the several rotors, providing a powerful "tool" for meeting stability requirements, since stability characteristics are sensitive to variations of the dihedral angles.

If desired an additioned control for trimming the attitude of the helicopter in the pitching plane, enabling the aircraft to be flown on an even keel at all forward speeds within its speed range, may be provided by trunnion-mounting the hubs of the side-by-side rotors, the trunnion axes (when projected horizontally) being substantially radial of the circle containing the rotor centres, and the hubs being coupled to the "attitude-trimming" control circuit so that both hubs are displaced by the control in the same sense in projection on the fore and aft vertical plane. Since these displacements are tangential of the said circle and of opposite sense with respect to cyclic symmetry around the said circle, operation of such a control does not disturb the torque balance compensation or alter the dihedral angles. Since the transmission shafts connecting the central distribution gear-box with the rotor hubs lie in vertical planes which are substantially radial of the said circle, the trunnion axes are made to coincide with the transmission shaft axes, thus providing a simple solution of the mechanical problems. It will be seen that the "attitude-trimming" control circuit will be loaded with the transmission shaft torque reaction, but being relatively constant it can be balanced out, e. g. by springs, or an irreversible control circuit can be used, which is in any case advisable for a "trimming" control. Apart from this relatively constant torque-reaction, residual torque reactions such as are fed back to the control circuits of conventional "tilting-hub" rotor controls will not be experienced, since the hub has one degree only of tilting freedom, and the residual torque reactions can only be fed back on to the control circuits when the hub has two degrees of tilting freedom.

Other novel features of a three-rotor helicopter according to this invention will be mentioned and explained in the following description of a specific example with reference to the accompanying drawings, of which, Figs. 1 to 3 are general arrangement views of a helicopter embodying the invention, in plan, side and front elevations respectively;

For convenience, the description of the specific example of a helicopter according to the invention will be divided into sections, numbered 1 to 8.

1. *General arrangement.* (*Figs. 1 to 3 and 4.*)

Figure 1:
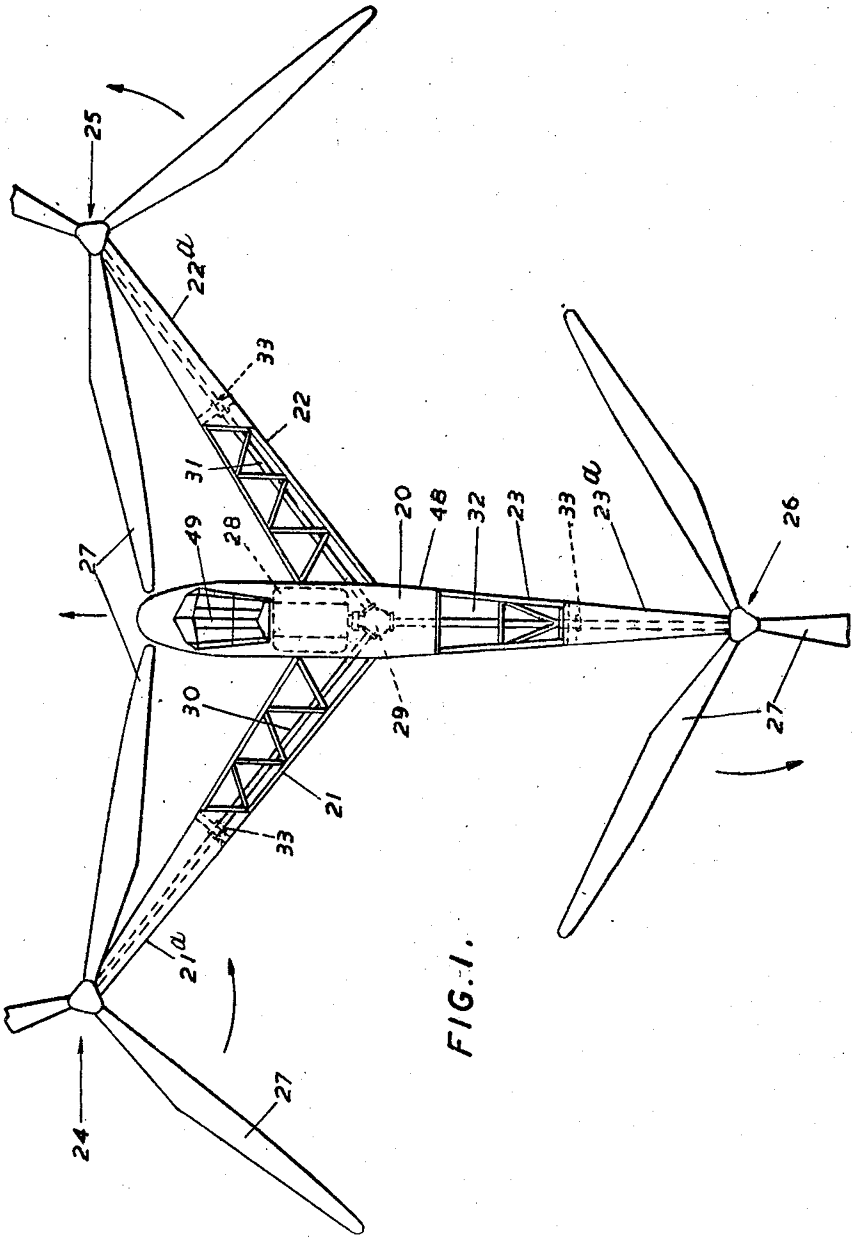

The helicopter has a body 20 provided with three outriggers 21, 22, 23 arranged at angles of 120° in plan, the outrigger 23 being in the fore and aft vertical plane of symmetry of the helicopter whose normal (forward) direction of travel is indicated by an arrow in Fig. 1. The inboard parts 21 to 23, of the outriggers are constructed as lattice girder and their outboard parts $21^a$, $22^a$, $23^a$ are of monocoque construction. The outriggers support three identical three-bladed rotors 24, 25, 26 having identical blades 27; and all three rotors rotate counterclockwise as seen from above, the directions of rotation being indicated by arrows in Fig. 1. All three rotors are driven by a single engine 28 through distribution gears housed in a distribution gear-box 29 and through "high speed" transmission shafts 30, 31, 32 respectively. The transmission shafts are enclosed in the outriggers which carry steady bearings 33 for the shafts at about their mid length. At the ends of the outriggers are mounted gear-boxes 34, 35, 36 containing speed-reduction gearing through which the hubs 37, 38, 39 of the rotors are driven.

There are three identical undercarriage elements comprising oleo-pneumatic struts 40, 41, 42 secured respectively to the outriggers 21, 22, 23 and each braced by struts 43 and terminating in forks 47 which carry the three wheels 44, 45, 46. The travel of the oleo-pneumatic legs, which is indicated in chain-dotted lines in Fig. 2, is very large by conventional standards being of the order of five feet in the illustrated example.

Figure 2:
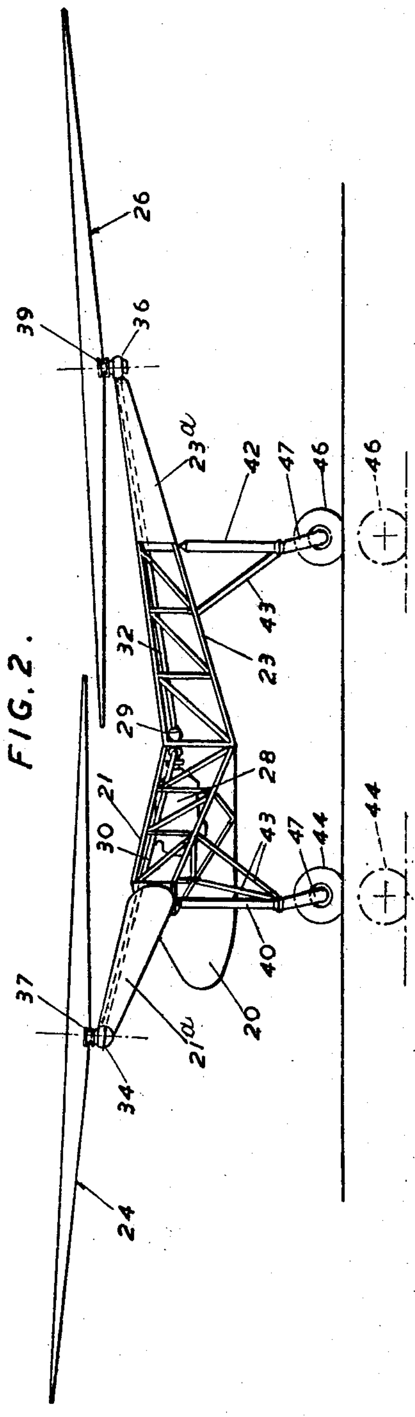

The body proper is covered with a skin 48 the rear part of which has been removed in Fig. 2; the pilot's cabin is in the fore part of the body and is indicated at 49 in Fig. 1. The lay-out of the pilot's flying controls and the pilot's seat 15 are shown in Fig. 4.

Figures 4, 5:
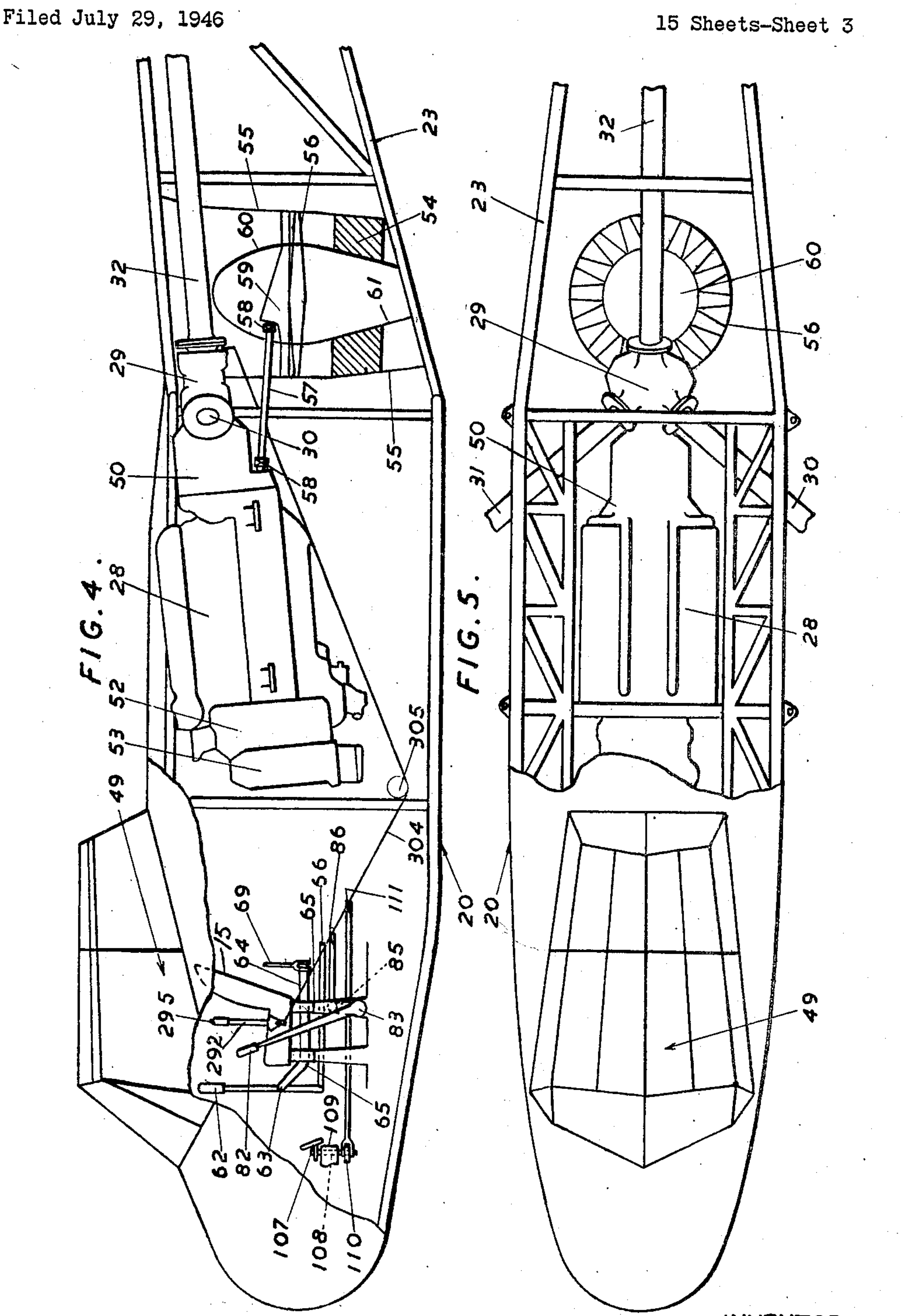
Figs. 4 and 5 show the body, partly "cut-away," in side elevation and plan respectively.

2. *Power plant.* (*Figs. 4 and 5.*)

The single engine 28 is of the liquid cooled 12 cylinder V-type with single spur reduction gear and gear-driven supercharger. It is mounted in the fore and aft line with the reduction gear casing 50 and main power shaft 51 (see Fig. 10) at the rear and the supercharger and carburettor housings 52, 53 at the front. It is slightly inclined, upwardly to the rear. Immediately in the rear of the engine is the main distribution gear-box 29 containing gears through which the power or input shaft 51 drives the three high-speed output shafts 30, 31, 32. A controllable clutch and free-wheel coupling are also provided, as hereinafter referred to.

Cooling is by means of an annular radiator 54 located in a vertical duct 55 enclosing a fan 56 which is driven from the engine crankshaft by an extension shaft 57 having universal joints 58 at each end, and bevel gearing housed in a fan gear-box 59. A two-piece streamlined fairing 60, 61 forms the core of the duct; the leading part 60 encloses the gear-box 59 and the trailing part 61 forms the core of the annular radiator. Air circulation through the duct is from above downwards and the fan thrust thus contributes slightly to the lift.

Figure 9:
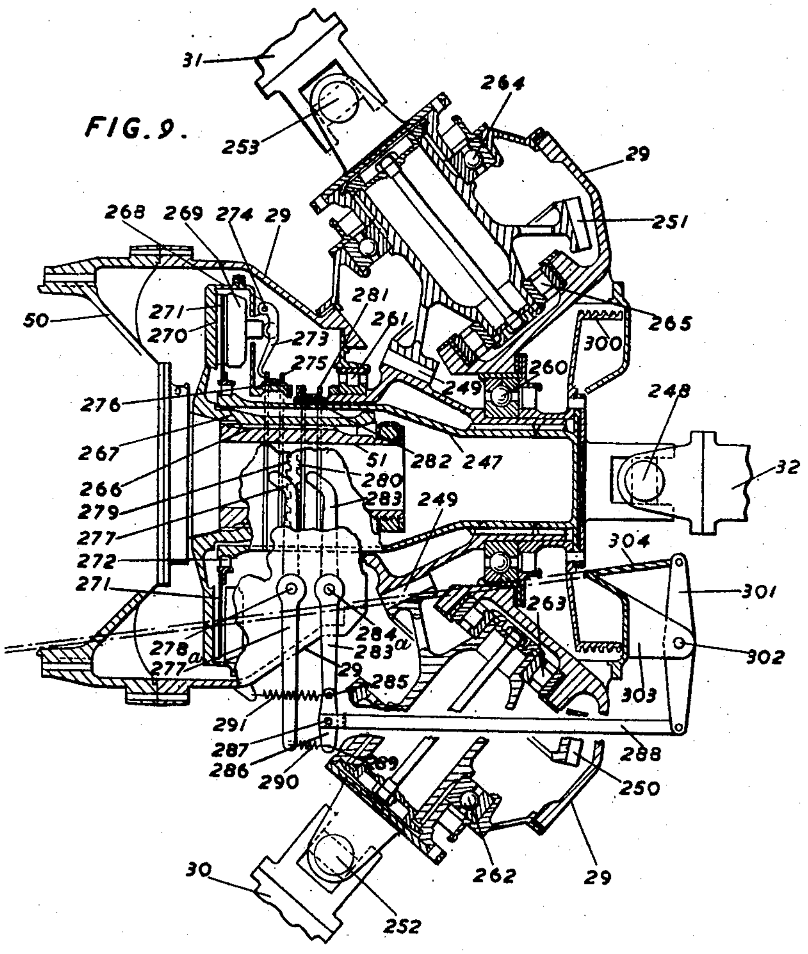
Figs. 9 and 10 are sectional plan and side elevation views of the "engine end" of the rotor transmission system.
Figure 10:
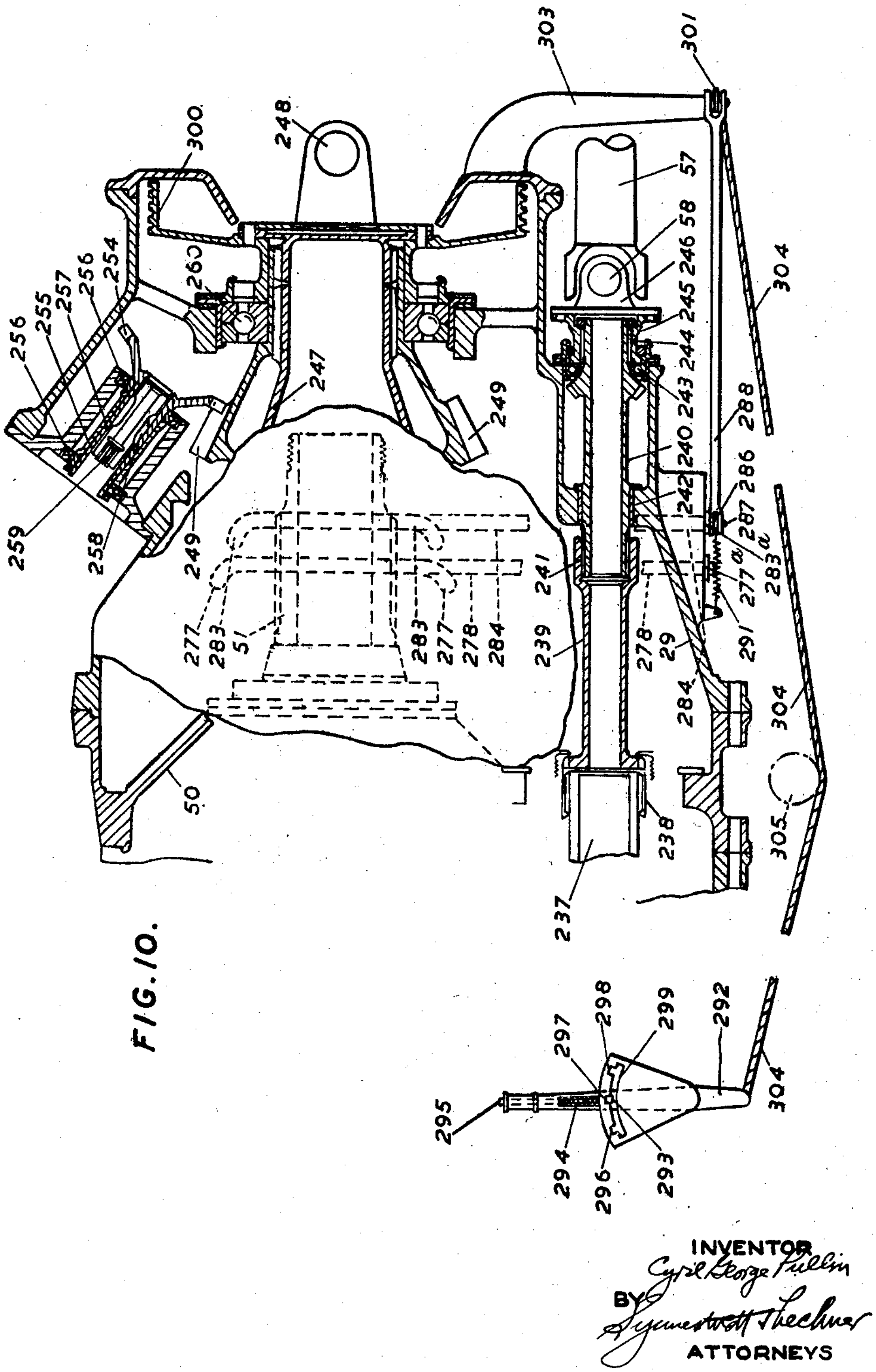
Figure 11:
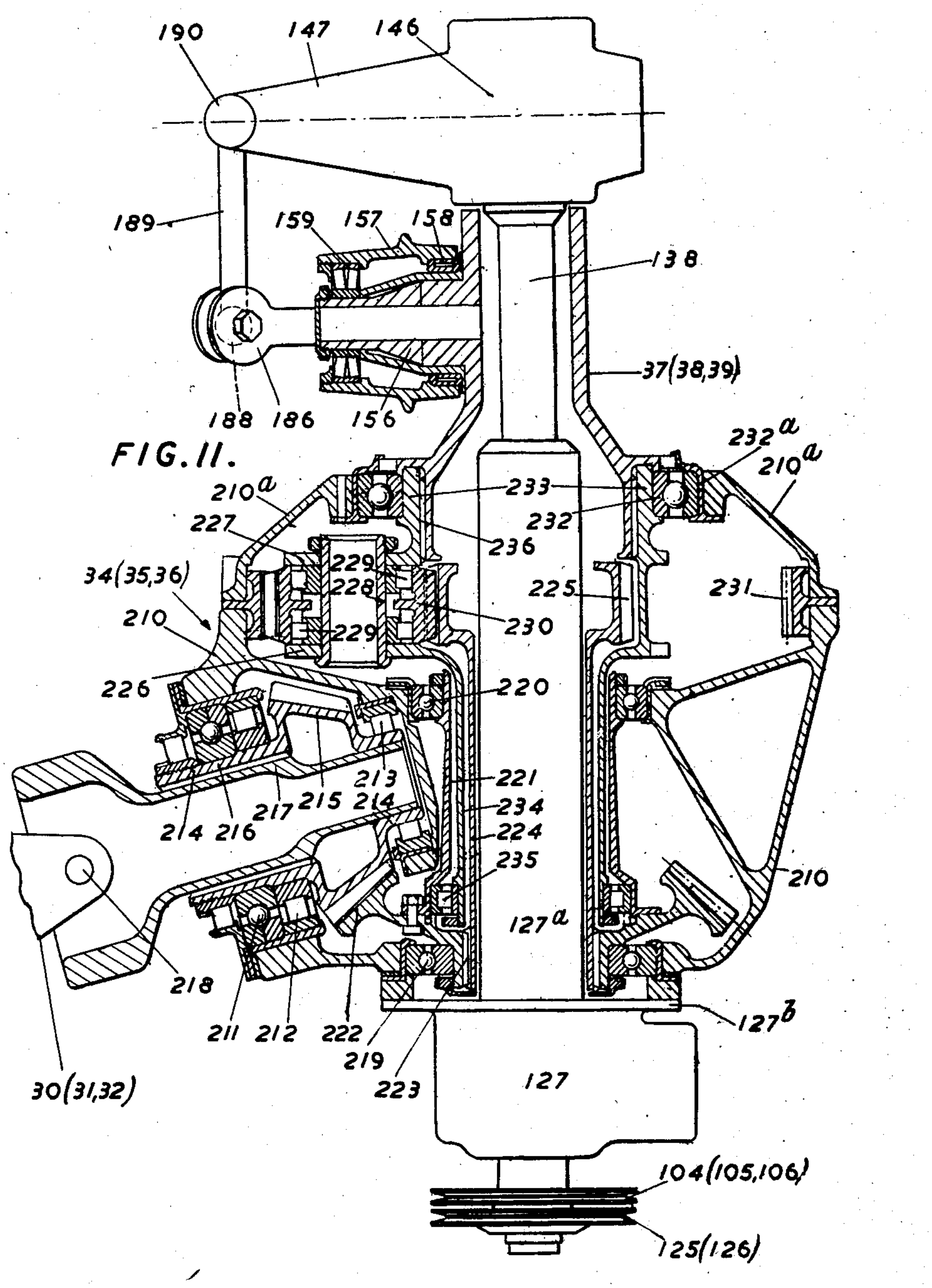
Fig. 11 is a sectional elevation of the "rotor end" of the transmission system and the hub of one rotor.

3. *Transmission.* (*Figs. 9 to 11.*)

The main reduction gear casing 50, forming part of the engine 28 (Figs. 4 and 5) and containing a single stage spur reduction gear train transferring the drive at reduced speed from the crank shaft 237 to the main power shaft 51, is directly bolted to the distribution gear-box 29 (Figs. 9, 10). This carries in bearings 242, 243 a shaft 240 aligned with the crankshaft 237 and coupled thereto by a coupling shaft 239 splined to shaft 240 at 241 and connected to the crankshaft by a splined sleeve 238. The outer end of the shaft 240 is splined at 244 and carries a correspondingly splined coupling element 245 which is secured to a forked member 246 forming part of the universal joint 58 through which the shaft 57 driving the cooling fan is driven.

Coaxial with the power or input shaft 51 is a master distribution shaft element 247, which is coupled to the input shaft 51 by a compound clutch and free-wheel coupling hereinafter described. The master element 247 is directly coupled to the high-speed output shaft 32 driving the rear rotor 26 by a universal joint 248. It also carries an integral master bevel gear 249 which is supported in the gear-box on bearings 260, 261, and meshes with bevel gears 250, 251 of the same diameter and number of teeth as gear 249. Gears 250, 251 drive the high-speed shafts 30, 31 of the two side by side rotors 24, 25 through universal joints 252, 253, similar to joint 248, and are supported in the gear-box 29 by bearings 262, 263 and 264, 265.

The master gear 249 also drives a small gear 254, whose shaft is supported in the gear-box 29 by bearings 256 and is splined at 257 to a quill shaft 258 having internal splines 259 for driving auxiliaries.

The driving splines 266 of the main "input" shaft 51 engage an internally splined sleeve 267 forming an integral extension of a clutch-housing 268 carrying a shifting clutch plate 269, between which and a friction face 270 of the clutch-housing the driven plate 271 of a friction clutch is engageable; and the clutch plate 271 is connected through a free-wheel roller clutch 272 with the master shaft element 247. Clutch operating toggle levers 273 are pivoted on the clutch-housing at 274 and operate to engage the clutch by pressing the clutch plate 269 towards the driven plate 271 and face 270. The toggle levers 273 are operated by means of a grooved collar 275 splined at 276 on the clutch-housing 268 and engaged by a striking fork 277 mounted on a rocking shaft 278 carried by the main gear-box 29. A dog clutch is also provided, comprising ratchet-teeth 279, formed on the clutch-housing 268 and corresponding teeth 280 formed on a sliding collar 281 splined at 282 on the master shaft element 247. The collar 281 is grooved and engaged by a striking fork 283 mounted on a rocking shaft 284 carried by the gear-box 29.

The rocking shafts 278 and 284 respectively carry external levers 277*a*, 283*a*. The end of lever 283*a* is connected by a spring 291 to a fixed point on the gear-box 29, and is provided with a pivot 285 to which is connected a floating link 286 whose other end 289 is connected by a spring 290 (of the same strength as spring 291), to the end of lever 277*a*. The floating link 286 is pivoted at its mid-point 287 to an operating rod 288 which is connected by a linkage, comprising a rocking lever 301 pivoted at 302 in a bracket 303 carried by the gear-box 29, and a cable 304 passing over a jockey-pulley 305 (see Fig. 4), with a cockpit lever 292 (see also Fig. 4), having a latch 293 loaded by spring 294 and operated by a press-button 295, the latch being engageable in any one of three notches 296, 297, 298, of a quadrant 299.

When the lever 292 is in the position corresponding to engagement of notch 296, both clutches are disengaged. To engage the clutches the latch is disengaged from notch 296 and the lever is pressed rearward. This moves rod 288 to the right in Fig. 9.

The movement of the rod 288 is transmitted to the rocking link 286, whose end 285 is anchored by spring 291, and thence through spring 290 to lever 277*a* and striking fork 277 which shifts the collar 275 to rock the toggle levers 273 and thus engage the friction clutch 269, 270, 271. As the latter engages, the spring 290 stretches and since spring 291 is of equal strength it stretches likewise and movement begins to be transmitted by the rocking link to lever 283*a* and striking fork 283. When the cockpit lever 292 has reached the middle of the quadrant 299, the friction clutch is "hard-up," but the dog clutch not yet engaged. The notch 297 can now be engaged to hold the cockpit lever in this position and maintain engagement of the friction clutch until slipping ceases. Further movement of the cockpit lever to the end of the quadrant, when notch 298 can be engaged, displaces rod 288 further and the rocking link transmits this further movement to the lever 283*a* and striking fork 283 only, since lever 277*a* can move no further, and both springs 290, 291 are further stretched. The striking fork 283 in this further movement shifts the collar 282 to effect initial engagement of the dog clutch 279, 280, whose ratchet-teeth are under-cut so that they are "self-engaging," and so long as the drive is being transmitted by them they maintain their mutual engagement automatically. The self-engaging action causes the striking fork 283 and lever 283*a* to rock somewhat further with the result that the rocking link 286 rocks slightly on its centre pivot 287 and relieves the spring load on the friction clutch so that the driving torque is transmitted from the clutch housing 268 to the master shaft element 247, substantially by the dog clutch only.

When the rotors tend to overrun the engine, on closing the throttle, or an accident "cut," or for any other cause, the dog clutch automatically throws-out, owing to the shape of the teeth, and the spring 290 yields to allow the rocking link 286 to rock on its centre pivot 287 and accommodate the shift of the dog clutch collar 282 in the disengaging direction; at the same time the roller clutch 272 allows the master shaft element 247 to overrun the driven clutch plate 271.

The master shaft element 247 also carries a rotor brake drum 300.

The outboard ends of the high-speed shafts 30, 31, 32 drive the three rotor hubs through identical transmission assemblies housed in rotor hub gear-boxes 34, 35, 36, as shown in Fig. 11.

The gear-box 34 (35 or 36) is in two parts, a main casing 210 and a top casing 210*a*, bolted together. The main casing supports in bearings 211, 212, 213 a driving pinion shaft 214 having an integral driving bevel pinion 215. Shaft 214 is splined at 216 to a coaxial coupling shaft 217 connected by a universal joint 218 to the high-speed transmission shaft 30 (31 or 32). Pinion 215 drives a bevel gear 222 supported on a bearing 219 in the casing 210 and having a hollow extension shaft 221 whose free end is supported in a steady bearing 220 mounted in a webbed portion of the casing 210.

Gears 215, 222 constitute a first stage of speed-reduction gearing. A second stage is provided by an epicyclic spur gear train comprising a sun pinion 225 integral with an inner hollow shaft 224, splined at 223 to the gear 222, an internal annulus 231 secured between the top and bottom casings 210*a*, 210, planet wheels 230, and a planetary cage consisting of top and bottom flanges 227, 226. The upper flange 227 has a hollow shaft extension 233, supported by the top casing 210*a* in a bearing 232; and the lower flange 226 has a hollow-shaft extension 234 disposed between the inner shaft 224 and the driven gear extension shaft 221, the bottom of which houses a bearing 235 in which the lower end of shaft extension 234 runs. The planet pinions 230 run on bearings 229 carried by hollow axles 228 mounted in the top and bottom flanges 227, 226 of the planetary cage. The rotor hub 37 (38 or 39) is screwed at 236 into the shaft extension 233 of the upper flange 227 of the planetary cage and is thus driven by the high-speed shaft 30 (31 or 32) through gearing giving a double speed reduction.

The thrust is taken by the bearing 232, which transmits it to the top casing 210*a* through a flanged bearing collar 232*a*.

The hollow hub 37 (38 or 39) and the hollow inner shaft 224 enclose the upward extension 127*a* of a pitch control mechanism casing 127 having an integral flange 127*b* by which it is secured to the bottom casing 210 of the hub gear-box 34 (35 or 36). The pitch control mechanism is fully described hereinafter, in Section 6 hereof.

3*a*. *Modification of hub assembly for "Attitude-Trimming"*

Figures 26, 27, 28:
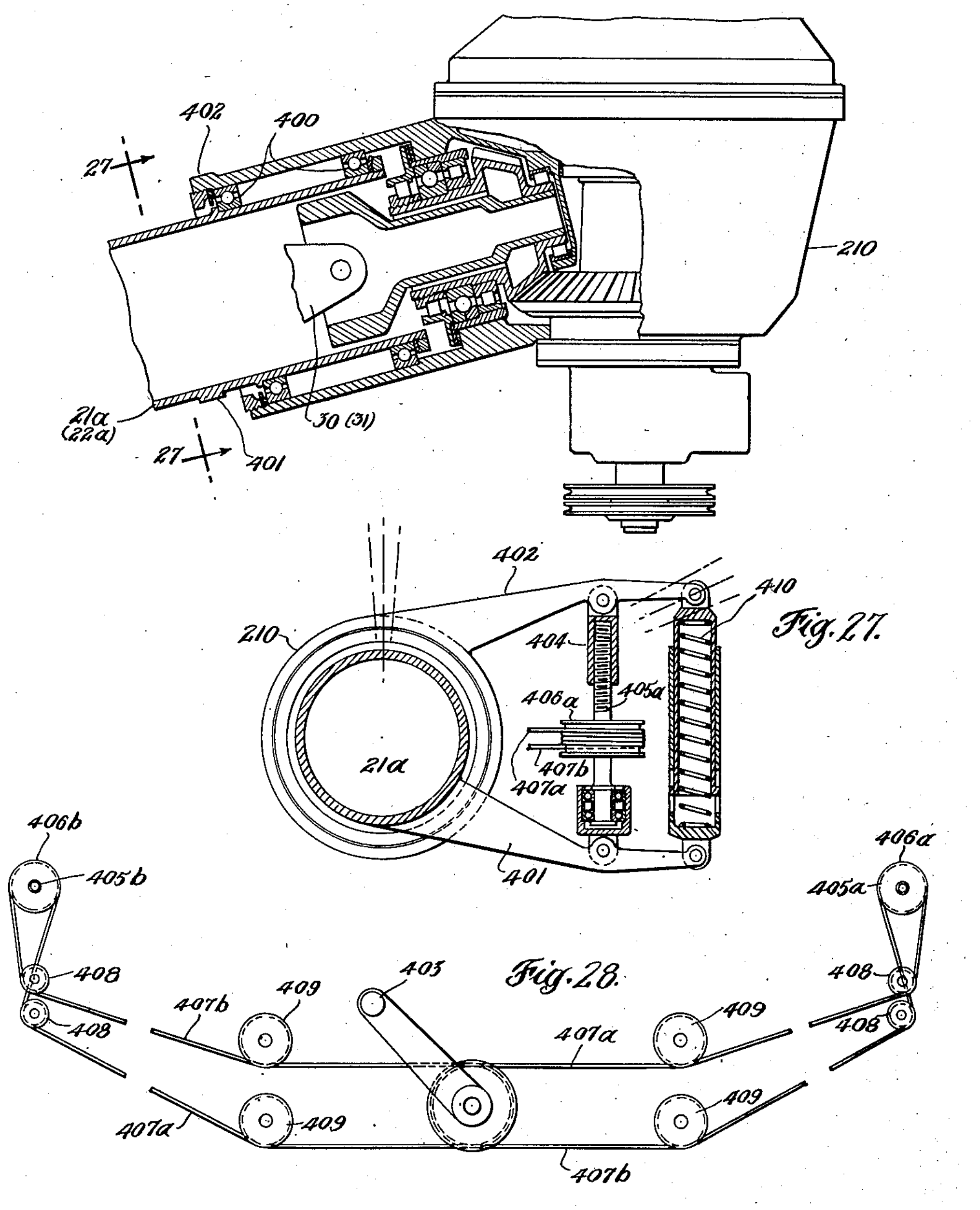
Figure 26 is an elevational view partly in section of the "rotor end" of the transmission system showing a modification of the gear-box mounting for attitude trimming.
Figure 27 is a view taken along the line 27—27 of Figure 26.
Figure 28 is a diagrammatic illustration of the attitude trimming control system.

The specific example described just above is not provided with an attitude trimming control as hereinbefore mentioned. The hub gear-boxes of all three rotors as illustrated in Fig. 11 are therefore rigidly bolted to the rotor-supporting outriggers. The above mentioned modification is illustrated in Figures 26, 27 and 28. In the embodiment illustrated in these figures the hub gear-boxes 210 of the two side-by-side rotors are mounted on thrust and radial bearings 400 carried by the outriggers 21*a* (22*a*) so as to have limited rotation about the axes of the high-speed shafts 30, 31, and are provided with levers 401, 402 connected to a common trimming control member 403 by means of nut 404, screws 405*a*, 405*b*, pulleys 406*a*, 406*b*, and cable runs 407*a*, 407*b*. The cable is supported by guide pulleys such as 408, 409. Displacement of member 403 rocks both gear-boxes 210 in the same direction, in projection on the fore and aft vertical plane; and rotation of the gear-boxes 210 on their bearings 400 under the effort of the torque-reaction of the high-speed shafts is resisted by springs such as 410 interposed between levers 402 and 401 which react respectively on the gear-boxes 210 and on the outriggers 21a (22a). The strength and rate of the springs 410 is desirably selected so that the gear-boxes 210 float on their bearings 400 under the opposed efforts of the torque-reactions and the springs throughout the normal range of torque-reaction loading, and so that displacement of the gear-boxes from their floating position to either extreme of the trimming range can be effected without the springs throwing excessive loads on the control circuits requiring the application of excessive force to the control member to effect the displacement. In other words, the spring-rate should be such that the full range of trimming control displacement produces a change of spring force of a few per cent at most.

Figure 12:
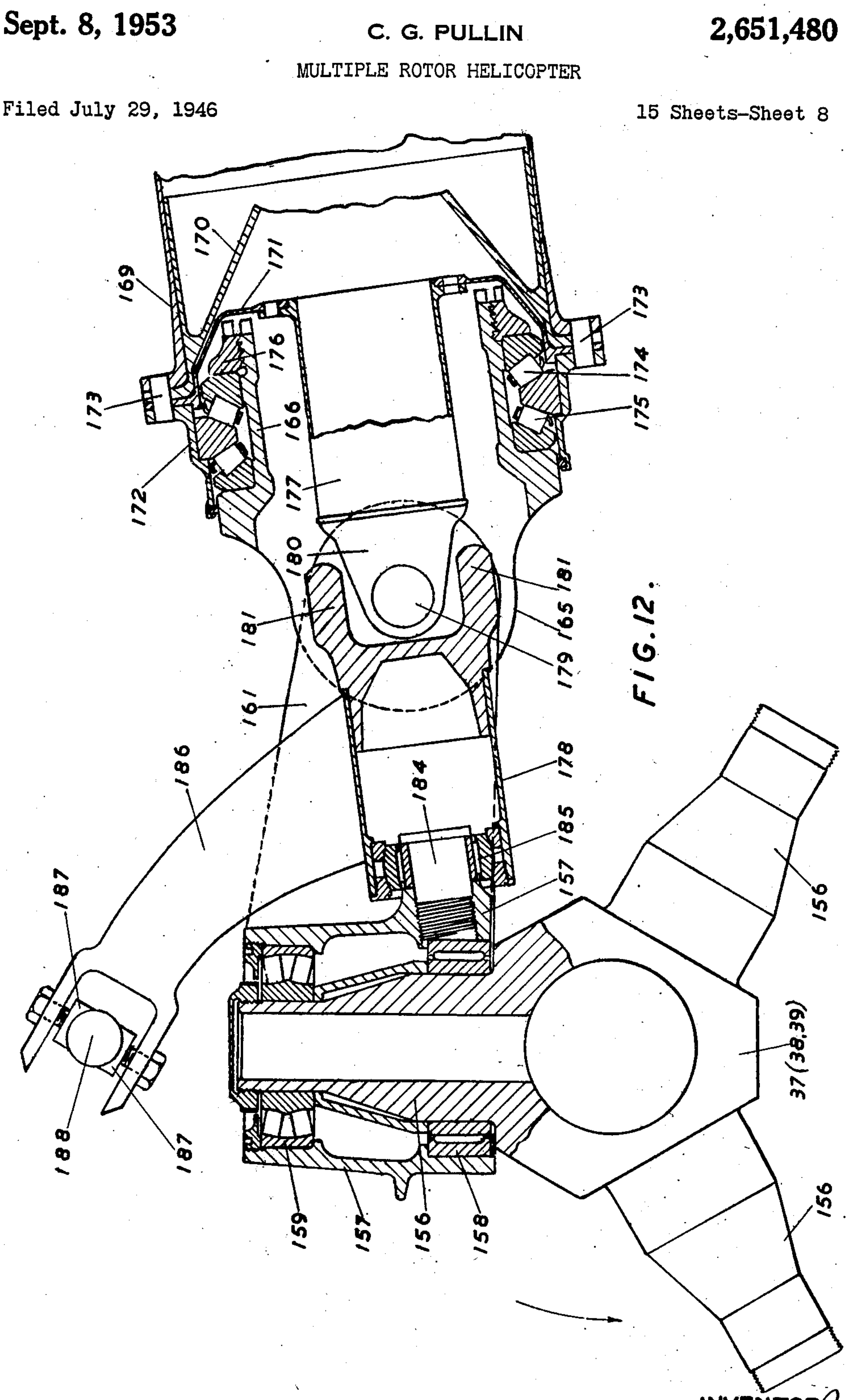
Fig. 12 is a plan, partly sectioned, of a rotor hub, showing one blade root assembly attached.
Figures 13, 14:
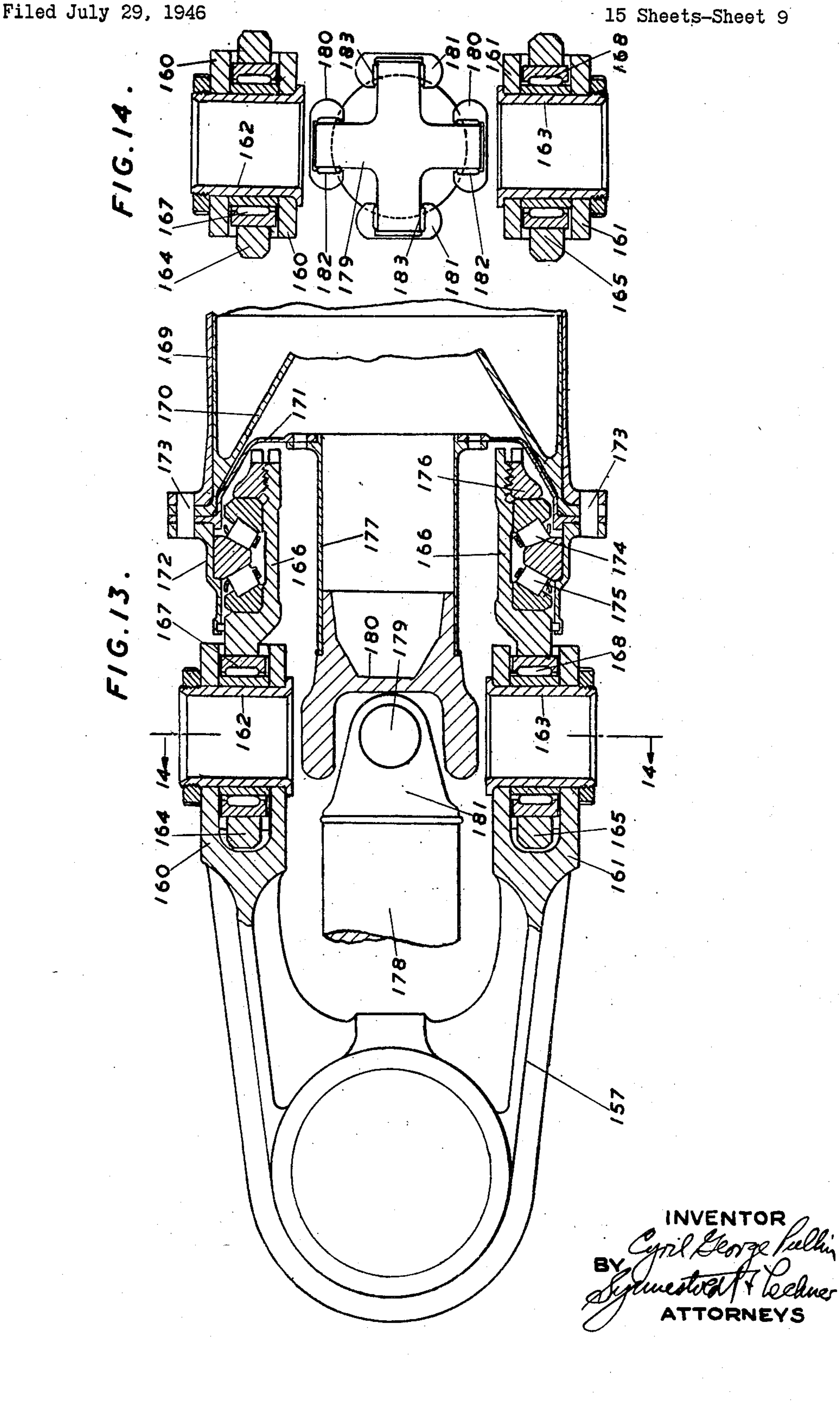
Fig. 13 is an elevation, partly sectioned, of one blade root assembly.
Fig. 14 is a section on the line 14—14 of Fig. 13.

4. *Rotor blade mountings and pitch control connections. (Figs. 12 to 14.)*

The hub 37, 38 or 39 of each rotor has three flapping pivot pins 156, whose axes intersect the hub axis at included angles of 120°. Thus there is no "flapping-pivot offset." Each flapping pivot pin carries a drag link 157 on an inboard needle roller bearing 158 and an outboard double-row self-aligning roller bearing 159. The drag link is forked and its fork-ends 160, 161 are slotted to accommodate the fork-ends 164, 165 of a blade root stub 166, and support coaxial drag pivot pins 162, 163 on which the fork-ends 164, 165 of the blade root stub are journaled by means of needle roller bearings 167, 168. The blade root, which consists of four elements 169, 170, 171 and 172, bolted together at 173, rotates on the stub 166 for pitch angle variation, being mounted by means of a bearing assembly comprising a taper-roller thrust and radial bearing 174, a taper-roller pre-load bearing 175, and a pre-loading collar 176 with buttress threads, screwed on to the stub 166.

The diaphragm element, 171, of the blade root carries an inboard extension 177, which is coaxial with the blade root and is connected to a pitch-change torque tube 178 by a universal joint, centred on the drag pivot axis and comprising a cruciform trunnion block 179 articulating with the forked ends 180, 181 of extension 177 and torque-tube 178 on needle roller-bearings 182, 183 respectively.

The inboard end of the torque-tube 178 is supported by means of a needle roller bearing 185 on a stud 184, screwed into the drag link 157; and the torque-tube has an integral lever 186 whose forked end carries spherical seating elements 187 of a ball joint, of which the ball 188 is formed on the end of a vertical link 189 (shown in Fig. 11). Fig. 11 also shows that the other end of the link 189 is connected by a ball joint 190 with one of the arms 147 of the swash-plate 146, the mounting of which is described in the succeeding section on Pitch Control Mechanism.

The centre of the ball joint 187, 188 is aligned in plan on the axis of the flapping pivot pin 157, thus obviating any inter-action between flapping and pitch angle, and this alignment is maintained, notwithstanding displacements of the blade on the drag pivot by the circumstance that the alignment of the torque-tube 178 with respect to the drag link is maintained constant by the spigot bearing 184, 185 and the universal joint 179—183, centred on the drag pivot axis, which joint accommodates displacements about the last named axis, while transmitting pitch-changing displacements to the rotor blade. The direction of rotation of the rotor being counter-clockwise as indicated by the arrow in Fig. 12, the centre of the ball joint 187, 188 is advanced nearly 90° from the radial axis of the blade; and the corresponding swash-plate arm 147, being vertically above the ball joint 187, 188, consequently has the same advance from the radial blade axis.

5. *Control circuits. (Figs. 6, 7, and 8—see also Fig. 4.)*

The control column 62 is pivoted at 63 for fore and aft movement on a rocking shaft 64 supported in bearings 65. Fore and aft movement of the control column is transmitted by means of a push-pull rod 66 to the vertical arm of a bell-crank 67; and lateral movement of the control column is transmitted by the rocking shaft 64 and a crank 68 fixed thereto, through a link 69, a bell-crank 70 and a push-pull rod 71, to the vertical arm of a bell-crank 72. The bell-cranks 67, 72 are pivoted on a bracket 73 secured to a vertical pillar 74, and their horizontal arms are respectively connected by vertical links 75 and 76 with arms 77 and 78 of a horizontal spider 79, the arm 77 being fore and aft and rearwardly directed and the arm 78 being at right angles to arm 77 and directed to port. The spider is mounted concentrically on pillar 80 by means of a universal joint 81 (here shown as a ball joint, which will be provided with means (not shown) preventing rotation of the spider) and it will be seen that the linkage described transmits fore and aft and lateral rocking of the control column to the spider, so that the latter repeats the displacements of the control column.

The "pitch-change" lever 82 is mounted on a transverse rocking shaft 83 supported in bearings 84 and carrying a crank 85 which is connected by a push-pull rod 86 to the vertical arm of a bell-crank 87, whose horizontal arm is connected to the pillar 80, which slides vertically in guides 88. Operation of the pitch-change lever thus raises and lowers the spider 79 bodily.

The spider 79 has two other horizontal arms 89 and 90 disposed at angles of 120° with arm 77 and with one another. The arms 89, 90, 77 are connected at equal radii from the centre of the spider with vertical links 91, 92, 93, whose other ends are respectively connected to cranks 94, 95 and 96, operating pulleys 97, 98 and 99, which carry cables 100, 101 and 102 respectively. The latter are led over jockey pulleys 103 and operate pulleys 104, 105, and 106 coaxial with the several rotor hubs. These pulleys operate the collective pitch control mechanisms of the several rotors. It will be seen that raising or lowering of the spider 79 in response to operation of the pitch change lever 82 applies equal rotations in the same sense to all three pulleys 104, 105, 106, to vary the collective pitch angles of all the rotors equally in the same sense; and that rocking of the spider on its universal joint in response to movements of the control column applies differential rotations to the pulleys. Fore and aft movement applies equal rotation in the same sense to the pulleys 104 and 105, to increase (or decrease) equally the collective pitch angles of rotors 24 and 25, and a contrary rotation to the pulley 106, to vary the collective pitch angle of rotor 26 in the opposite sense; and lateral movement applies equal and opposite rotations to pulleys 104 and 105, to apply equal and opposite variations to the collective pitch angles of rotors 24 and 25, and no rotation to pulley 106.

The rudder-bar 107 is mounted on a vertical pillar 108, which is supported in a bearing 109 and carries a crank 110 connected by a push-pull rod 111 to the vertical arm of a bell-crank 112, whose horizontal arm is connected by a vertical link 113 with a two-armed lever 114 pivoted on a fore and aft horizontal axis at 115. The arms of lever 114 are respectively connected by push-pull rods 116, 117 with cranks 118 and 119 operating pulleys 120 and 121 carrying cables 122, 123, which are led over jockey pulleys 124, and operate pulleys 125 and 126 coaxial with the hubs of the side by side rotors 24 and 25.

Movements of the rudder-bar apply equal and opposite rotations to the pulleys 125, 126, the direction of rotation depending on whether "port" or "starboard" rudder is applied. The pulleys 125, 126 operate the cyclic pitch control mechanisms of the rotors 24, 25. The mechanism, which is described in the succeeding section on Pitch Control Mechanism, varies the amplitude and sign of the cyclic pitch variation, but not its phase, the zero phase being substantially in the fore and aft azimuth. Variation of the cyclic pitch amplitude therefore varies the inclination of the lift vector in the fore and aft azimuth, and consequently varies the horizontal component of the lift in that azimuth; and the opposed rotations of pulleys 125, 126 therefore introduce opposed or differential cyclic pitch control of the two side by side rotors, giving equal and opposite variations of the fore and aft horizontal components of the lift producing equal yawing movements of the same sign, without introducing any transverse force.

6. *Rotor-blade pitch-control mechanism.* (*Figs. 15 to 18 and Fig. 11.*)

The collective pitch control mechanism of all three rotors is identical and is operated by the pulley 104 (105 or 106) mentioned in the preceding section on Control Circuits. The cyclic pitch control mechanism of the side by side rotors 24, 25 is identical and is operated by the pulley 125 (or 126), but the third rotor 26 has no cyclic pitch control.

The pulley 104 has an integral hollow shaft 128, coaxial with the rotor hub and supported in a fixed housing 127, by bearings 129, in which it can rotate and slide axially. The shaft 128 has an enlargement 130 in the form of a Z crank carrying an inclined ring 132 on a bearing 131. The ring 132 is prevented from turning, when the pulley 104 and Z crank 130 are rotated, by an integral arm 133 terminating in a ball 134 located in a socket 135, which can slide radially of the axis of shaft 128 in a pocket 136 formed in the housing 127. Rotation of the Z crank 130 by the pulley 104 rotates the vertical plane in which the ring 132 is inclined without rotating the ring itself, and since the ring is anchored at the centre of ball 134 its centre is caused to shift axially of the shaft 128 causing this shaft to rise or fall.

The axial displacement of shaft 128 is transmitted through a bearing 137 to an extension sleeve 138 which is prevented from rotating by a splined joint 139 in which sleeve 138 is supported by the upper end of a tubular extension 127*a* of the fixed housing 127 lying coaxially within the rotor hub assembly. The sleeve 138 supports the rotary swash-plate 146 whose arms 147 are connected to the rotor blade pitch changing levers 186 as already described, so that axial displacement of shaft 128 and sleeve 138 applies collective pitch angle variation to the rotor blades.

In the two side by side rotors, 24, 25, the swash-plate 146 rotates on bearings 144, 145 carried by a hollow centre member 143, which is supported in bearings 142 on trunnions 141 integral with a fork 140 constituting an extension of the sleeve 138, which is prevented from rotating by the splines 139. The swash-plate is therefore free to rock about one horizontal axis only, namely the axis of trunnions 141, since the sleeve 138 does not rotate. Rocking of the swash-plate about the axis of trunnions 141 therefore provides cyclic pitch control of invariable phase whose zero is in the vertical plane perpendicular to the trunnion axis, since the arm 147 is advanced substantially 90° in the direction of rotation of the rotor from the radial axis of the rotor blade to which it is connected; and this causes the plane containing the blade tip path, and consequently the lift vector, to reproduce the angular displacement of the swash-plate about the axis of trunnions 141. This axis is substantially perpendicular to the fore and aft vertical plane, and consequently the angular displacements of the lift vector give rise to variations of the fore and aft horizontal component of the lift.

Rocking of the swash-plate 146 for cyclic pitch control is effected by rotation of the pulley 125 (or 126), which is mounted on a shaft 148 supported coaxially in the shaft 128 and sleeve 138 by bearings 149, 150. The shaft 148 terminates in an inclined crank 151, which carries, on bearings 152, an inclined ring 153 having trunnions 154. The member 143 has a second set of bearings 155, whose axis is perpendicular to that of the bearings 142 supported on the trunnions 141; and the trunnions 154 engage the bearings 155. Rotation of the shaft 148 by the pulley 125 rotates the plane in which the crank 151 and trunnion ring 153 is inclined; and consequently the axis of the trunnions 154 which cannot rotate, being located in plan by the centre member 143, is caused to rock about the axis of trunnions 141 and impart its rocking displacement to the centre member 143 and swash-plate 146.

In the third or rear rotor 26, there is no cyclic pitch control, the items 125, 140, 141, 142, 148, 149, 150, 151, 152, 153, 154 and 155 being omitted and the centre member 143 being immovably secured to the sleeve 138; it would be more correct in this arrangement not to refer to the member 146 as a "swash-plate," but to call it a "transfer bearing ring."

Figure 16:
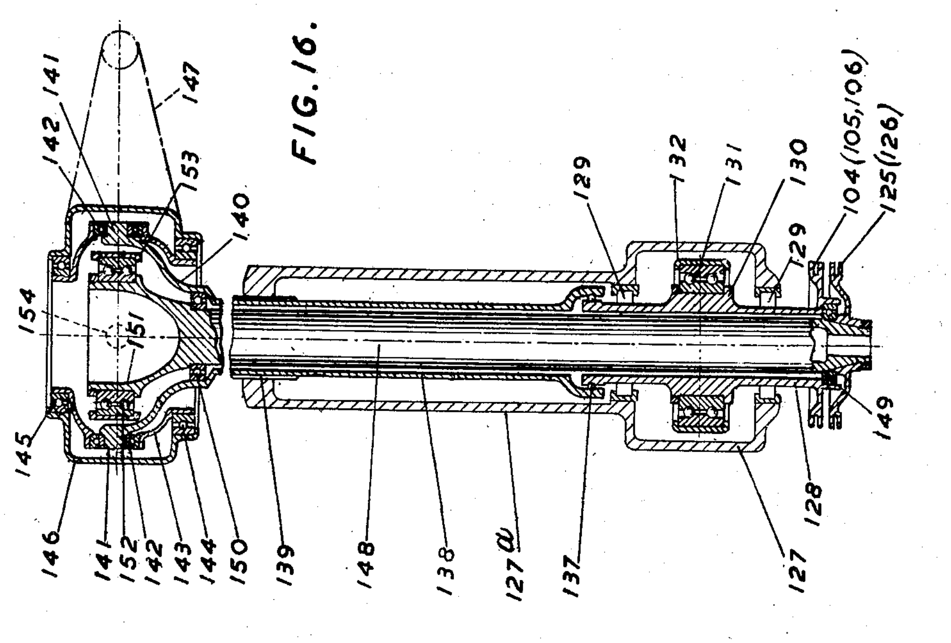
Figs. 15 and 16 are mutually perpendicular sectional elevations of the pitch control mechanisms housed in the rotor hub assembly.
Figure 15:
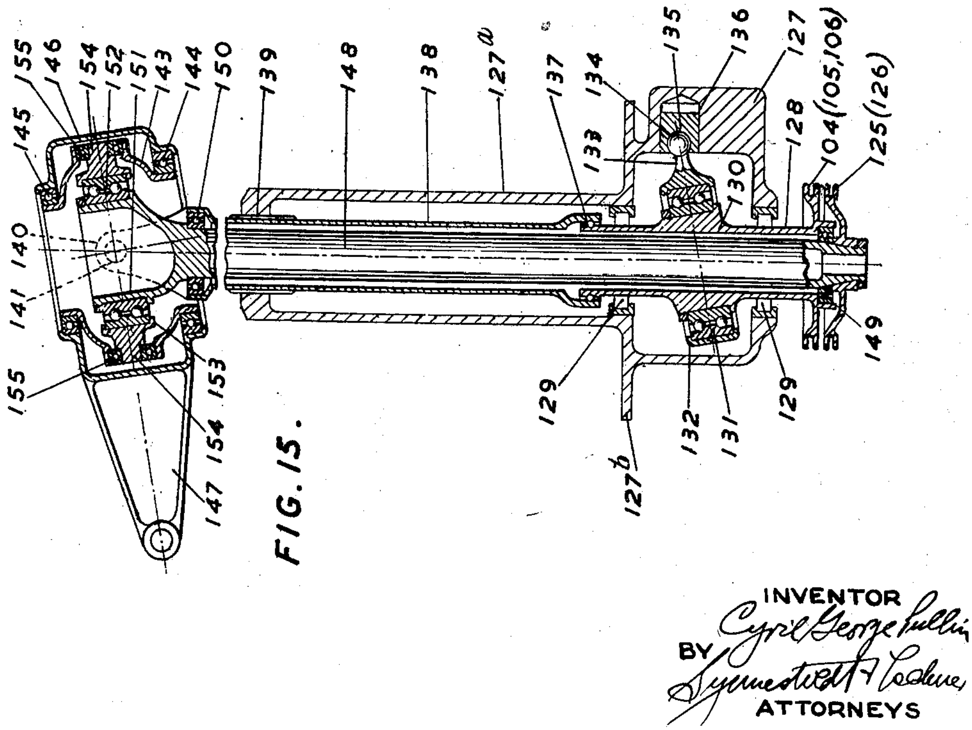
Figure 18:
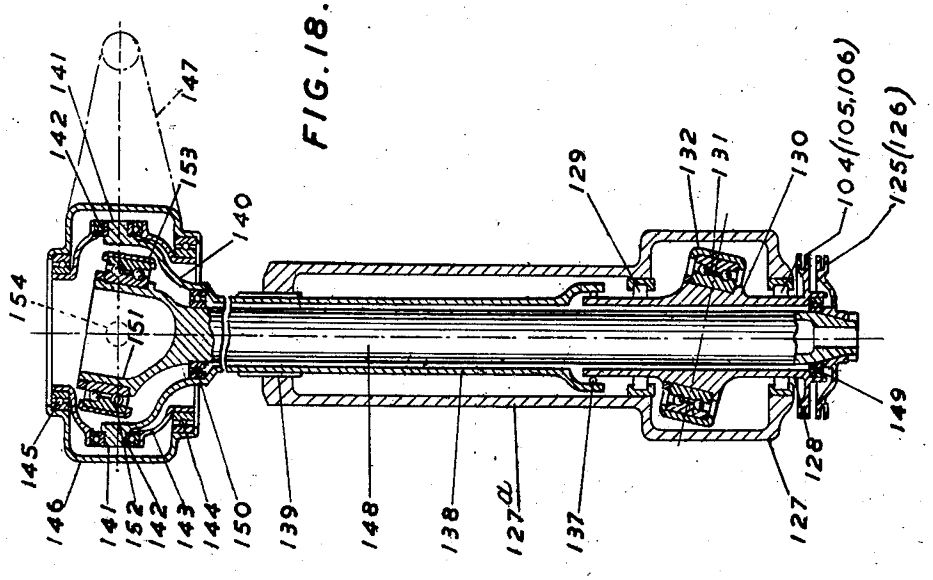
Figs. 17 and 18 are views corresponding respectively to Figs. 15 and 16 with the mechanisms displaced by control movements.
Figure 17:
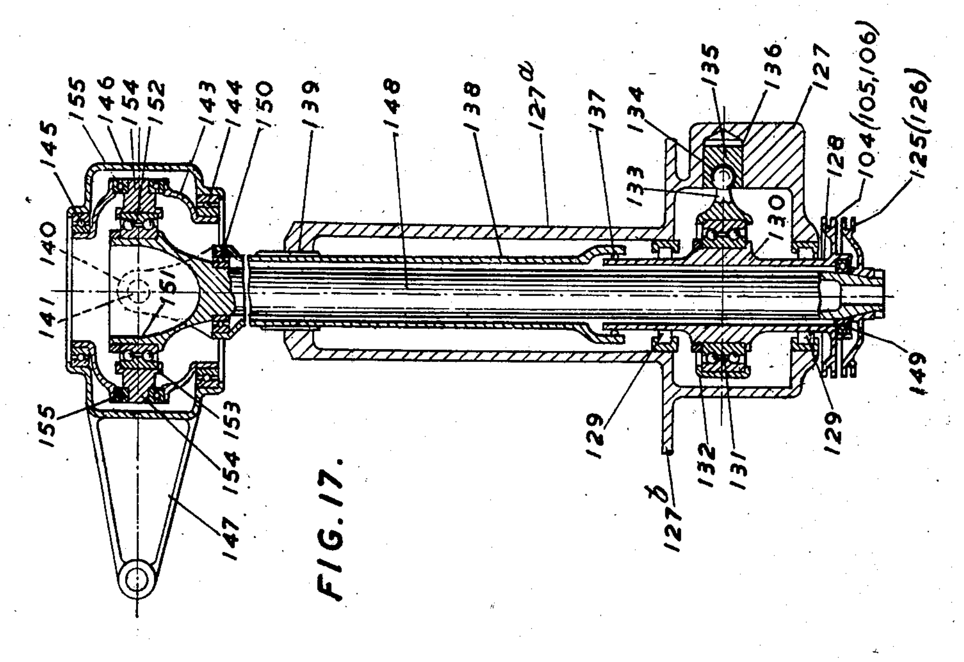

The neutral position of both the collective and cyclic pitch controls is shown in Figs. 17 and 18. Figs. 15 and 16 show the positions taken up when the collective pitch control pulley 104 has been rotated through 90° in the direction for fining the pitch by lowering the swash-plate 146. This is the minimum pitch position, 90° rotation in the opposite direction giving maximum pitch. Figs. 15 and 16 also show the positions attained when the cyclic pitch control pulley 125 has been rotated through 90° to give maximum inclination of a swash-plate 146 and maximum amplitude of cyclic pitch variation. 90° rotation of the pulley 125 in the reverse direction of course gives cyclic pitch variation of maximum amplitude and opposite sign.

If the pulleys 125, 126 could be rotated through 360°, the cyclic pitch amplitude would be varied from minimum, through zero (at 90° rotation), to maximum (at 180° rotation) and back through zero (at 270°) to minimum (at 360°). It will therefore be clear that the sign of the cyclic pitch control depends on which half of the complete 360° rotation is used; and consequently the sign of the control can be reversed by rotating the pulley through 180°. Synchronising the controls of the two rotors 24, 25 is therefore a matter of assembly. Since the pulleys 125, 126 rotate in opposite directions and are required to produce cyclic pitch variations of opposite sign, the cables 122, 123 must be assembled onto the pulleys 125, 126 so that, with the rudder-bar in the neutral position, both the inclined cranks 151 (of rotors 24 and 25) must be inclined in the same direction in the transverse azimuth of the aircraft. Whether this direction is port or starboard will depend on the run of the cables 122, 123, which determines the directions of rotation of the pulleys 125, 126 relative to those of pulleys 120, 121.

Since the control reverses at 90°, displacement of the operating pulleys 125, 126 from the neutral position and the ratio, change of yawing moment/control displacement changes, becoming progressively less, as the 90° position is approached, it is preferred to use less than 180° of total displacement of the pulleys 125, 126. The above mentioned ratio remains fairly constant for displacements up to ±50° and a total range of 120° may be considered suitable. Any sacrifice of total amplitude of yawing moment thus entailed may be made good by increasing the inclinations of the inclined cranks 151.

The foregoing paragraph also applies, mutatis mutandis, to the collective pitch control mechanism, the characteristics of which as regards the ratio, change of collective pitch angle/control displacement, are similar.

Figures 6, 7, 8:
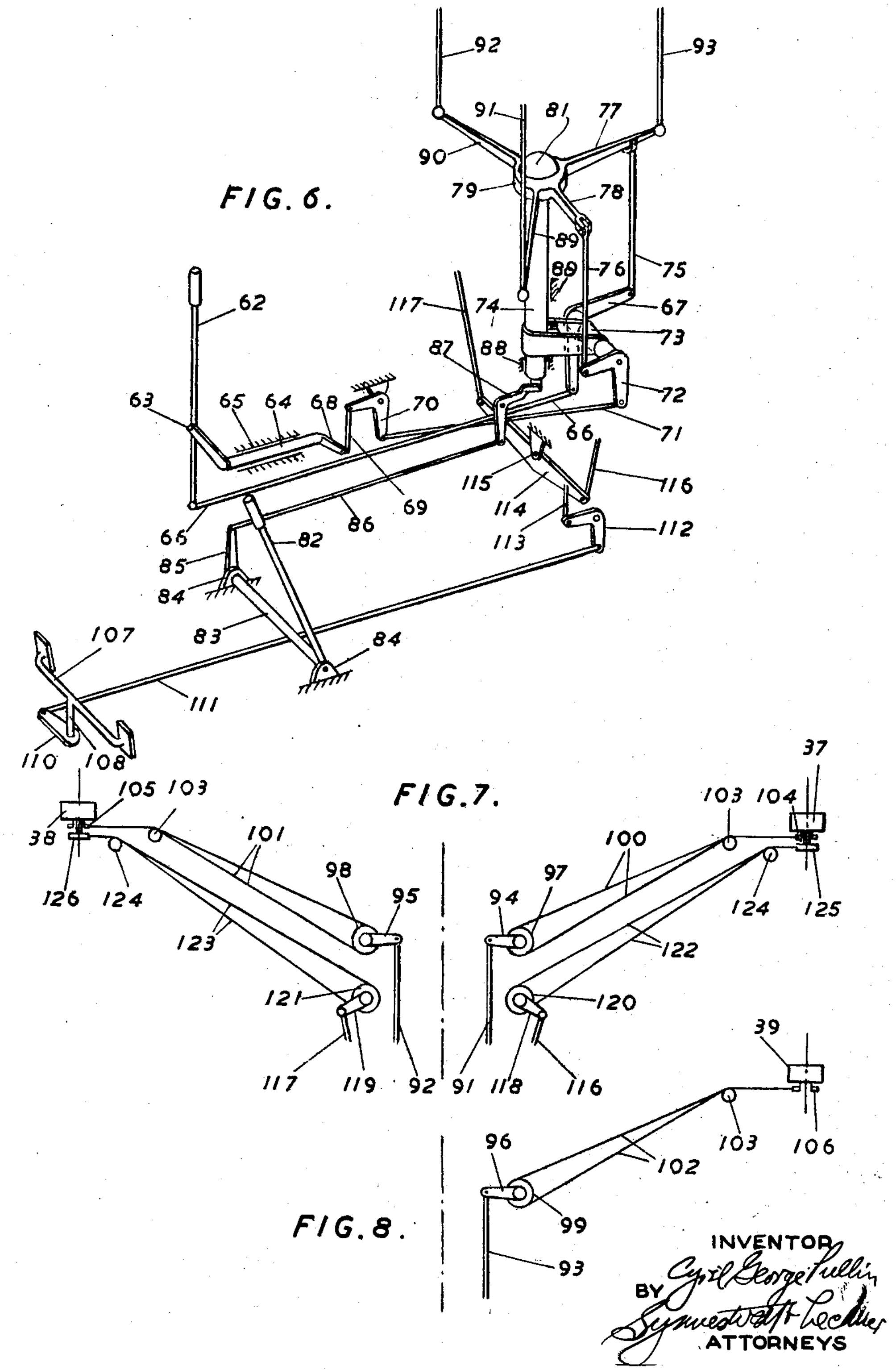
Figs. 6 to 8 are somewhat diagrammatic representations of the control circuits, Fig. 6 being a perspective view of the "cockpit ends" of the circuits, and Figs. 7 and 8 being front and side elevations of the "rotor ends" of the circuits.

Axial displacement of pulleys 104 and 125 when the collective pitch control is operated is accommodated by giving a sufficiently long "lead-in" to the cables 100 (101, 102) and 122 (123) from the jockey pulleys 103, 124 (see Figs. 7 and 8).

7. *Compensation of torque-reaction, and dihedral angles*

Figure 19:
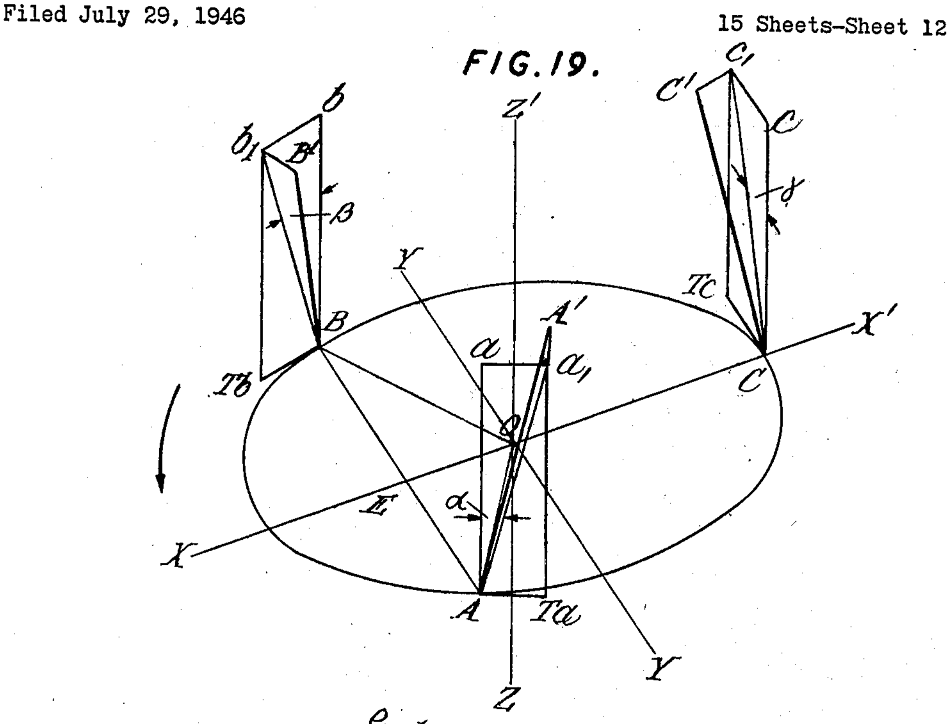
Figs. 19 to 21 are line diagrams illustrating torque reaction compensation and dihedral angles of the rotors, Fig. 19 being in perspective, and Figs. 20 and 21 in side and front elevation respectively.
Figure 20:
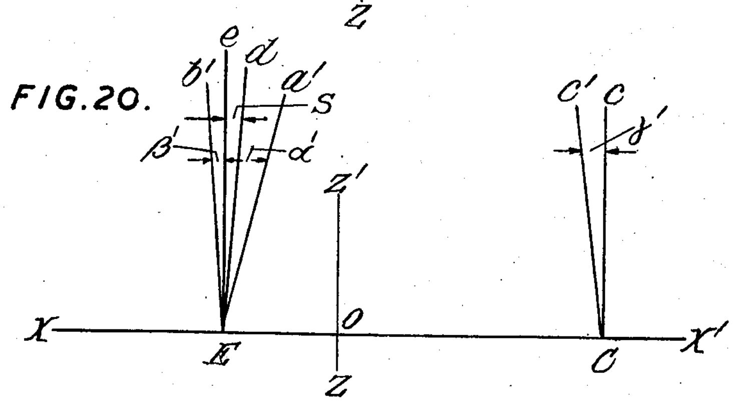
Figure 21:
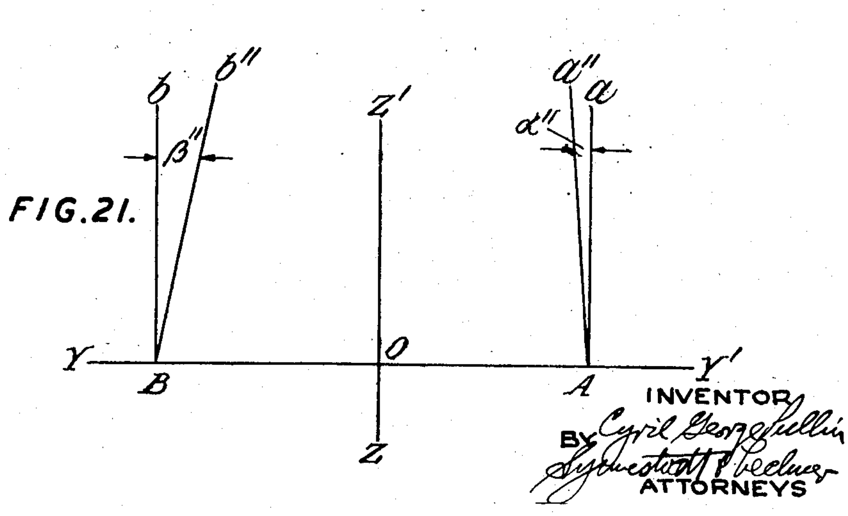

The diagrams, Figs. 19 to 21, illustrate the way in which the (mechanical) axes of the rotors are given "built-in" inclinations for torque-reaction-compensation and dihedral angles. A conventional system of rectangular axes XOX′, YOY′, ZOZ′ has its origin at O, the centre of the circle in the XY plane containing the centres A, B, C of the rotors, 24, 25, 26, respectively, the (mechanical) axes of which are indicated by the lines AA′, BB′, CC′. The vertical planes tangent to the circle at A, B, C are indicated by $aAT_a$, $bBT_b$, $cCT_c$ and the projections on these planes of the rotor axes are indicated by $Aa_1$, $Bb_1$, $Cc_1$ making angles $\alpha$, $\beta$, $\gamma$, respectively with the verticals $Aa$, $Bb$, $Cc$. These inclinations $\alpha$, $\beta$, $\gamma$, are equal and cyclically symmetrical with respect to the circle ABC being in a counterclockwise direction as viewed from above. This arrangement introduces equal horizontal components of the lift forces acting in the directions $AT_a$, $BT_b$, $CT_c$, which tend to yaw the whole aircraft in a counterclockwise direction, in opposition to the sum of the clockwise torque reactions of the rotors which rotate counterclockwise.

In Fig. 20 the rotor axes AA′, BB′, CC′, are projected on the XZ plane as $Ea'$, $Eb'$, $Cc'$, making angles $\alpha'$, $\beta'$ and $\gamma'$ with the vertical. The longitudinal dihedral angle is the angle between the projection $Cc'$ of the rear rotor axis CC′ and the line $Ed$, which is the bisector of the angle $a'Eb'$ enclosed by the projections $Ea'$, $Eb'$, of the rotor axes AA′, BB′, and makes an angle $S=\frac{1}{2}(\alpha'-\beta')$ with the vertical $Ee$. The longitudinal dihedral angle is therefore $\gamma'+S$.

In Fig. 21 the rotor axes AA′, BB′, are projected on the YZ plane as $Aa''$, $Bb''$, making angles $\alpha''$, $\beta''$ with the verticals $Aa$, $Bb$, respectively. The lateral dihedral angle is $\alpha''+\beta''$.

The radial component of the inclination of axis CC′ is $\gamma'$, and if the components of the inclinations of axes AA′, BB′ in vertical planes radial of the circle ABC are respectively $\alpha_1$ and $\beta_1$, it is evident that, $$\alpha'=\alpha\sin 60°+\alpha_1\cos 60°$$
$$\beta'=\beta\sin 60°-\beta_1\cos 60°$$
$$\alpha''=\alpha\cos 60°+\alpha_1\sin 60°$$
$$\beta''=-\beta\cos 60°+\beta_1\sin 60°$$

so that the longitudinal dihedral angle is given by $$\gamma'+S=\gamma'+\tfrac{1}{2}(\alpha'-\beta')=\gamma'+\tfrac{1}{2}(\alpha_1+\beta_1)\cos 60°+\tfrac{1}{2}(\alpha-\beta)\sin 60°$$
$$=\gamma'+\tfrac{1}{4}(\alpha_1+\beta_1)$$

and the lateral dihedral angle by $$\alpha''+\beta''=(\alpha-\beta)\cos 60°+(\alpha_1+\beta_1)\sin 60°$$
$$=\frac{\sqrt{3}}{2}(\alpha_1+\beta_1)$$

showing that the dihedral angles depend only on the "radial" inclinations of the rotor axes, when the "tangential" inclinations are equal and cyclically symmetrical. In the diagrams the angles are exaggerated for the sake of clarity.

8. *Jacking undercarriage.* (*Figs. 22 to 25.*)

Advantage is taken of the exceptionally long travel which must be provided for the shock-absorbing undercarriage struts to incorporate a self-jacking feature.

Figure 3:
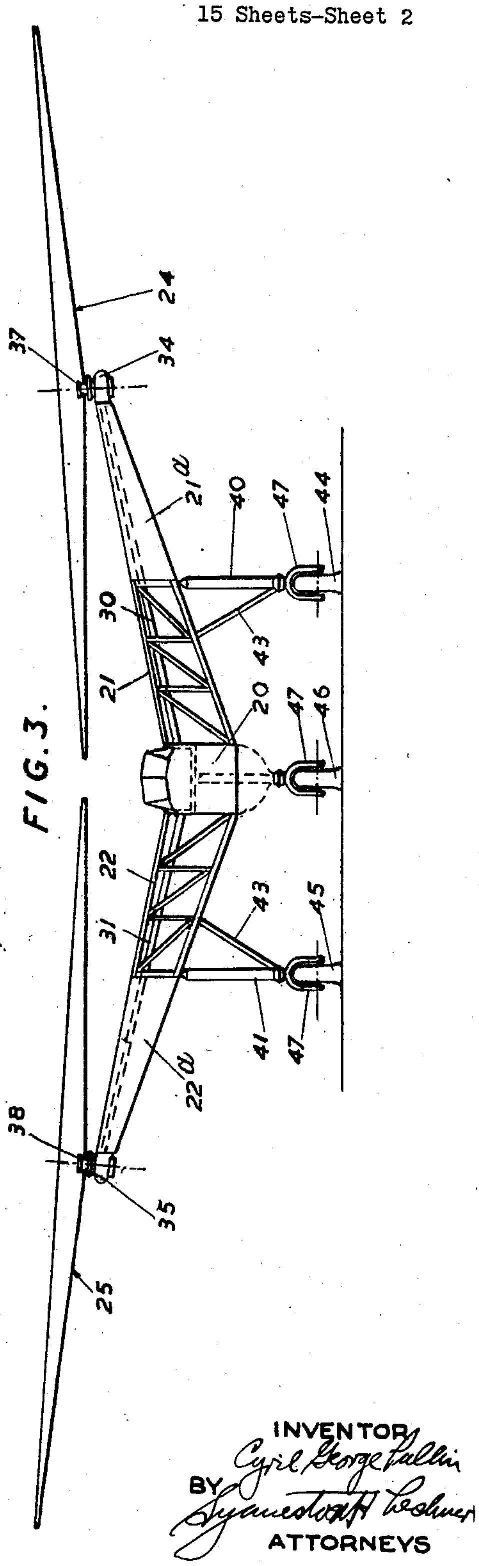
Figure 22:
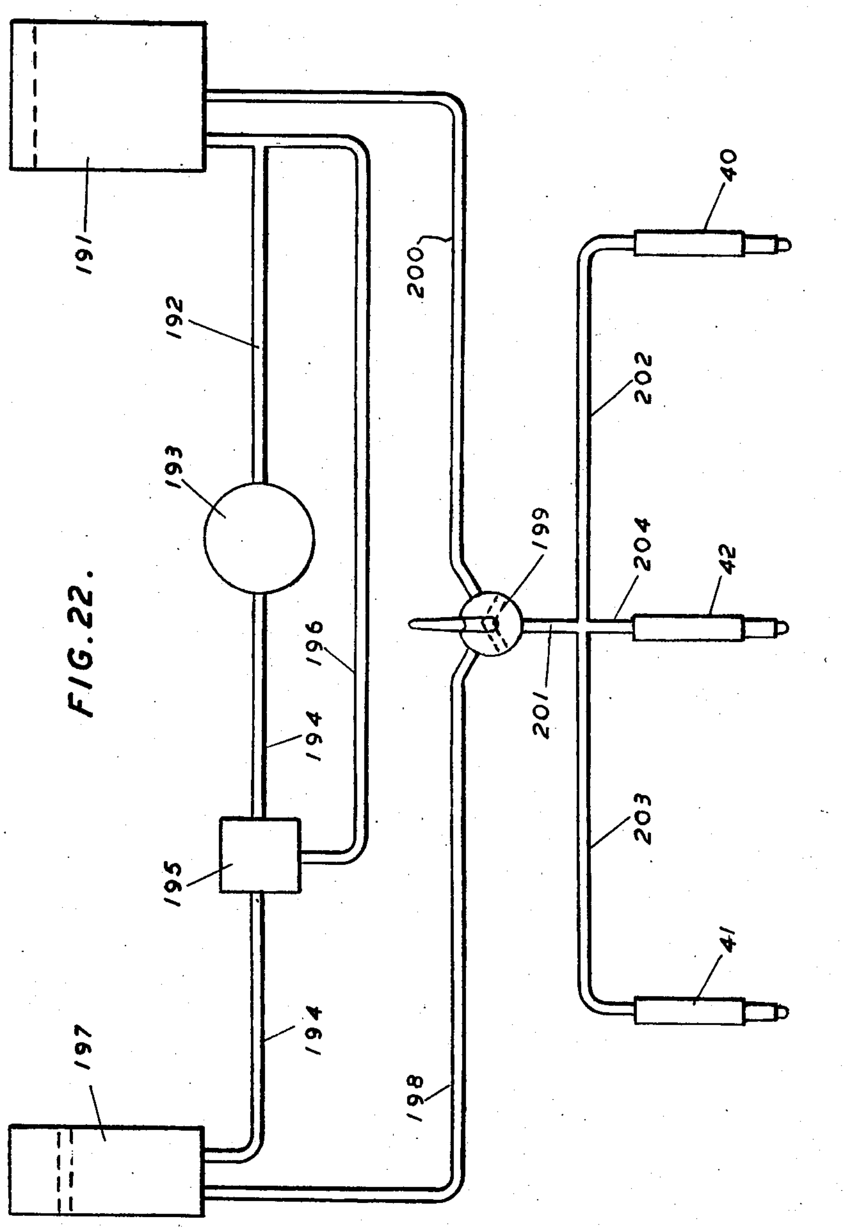
Fig. 22 is a hydraulic circuit diagram for a "self-jacking" undercarriage strut.

The hydraulic circuit shown in Fig. 22 consists essentially of a header tank 191, a suction line 192, engine-driven pump 193, delivery line 194, automatic pressure relief valve 195 and relief by-pass line 196, high-pressure accumulator 197, pressure main 198, selector valve 199, return main 200, and a combined pressure and exhaust service line 201 with three branches 202, 203, 204, connected to the three oleopneumatic shock absorbing struts 40, 41 and 42, shown in Figs. 2 and 3.

The selector valve 199 has three positions for "jacking," "neutral" and "lowering" respectively. In the jacking position the selector valve connects the service line 201 and its branches 202, 203, 204, with the pressure main causing the struts to extend and jack the helicopter to the full height corresponding to the extension of the struts. Jacking may be stopped at an intermediate height by moving the selector valve to "neutral" position in which it shuts off the service line from the rest of the system. In the "lowering" position the selector valve connects the service line to the return main 200.

The pump 193 sucks fluid from the header tank 191 through the suction line 192 and delivers it through the delivery line 194, past the relief valve 195 to the accumulator 197 which keeps the pressure main 198 filled and under working pressure at all times. Any excess pressure generated by the pump, due to keeping the selector valve in jacking position when the struts are fully extended, or to any other cause, is relieved through the relief valve 195, the excess delivery being by-passed back to the header tank through line 196.

Figures 23, 24, 25:
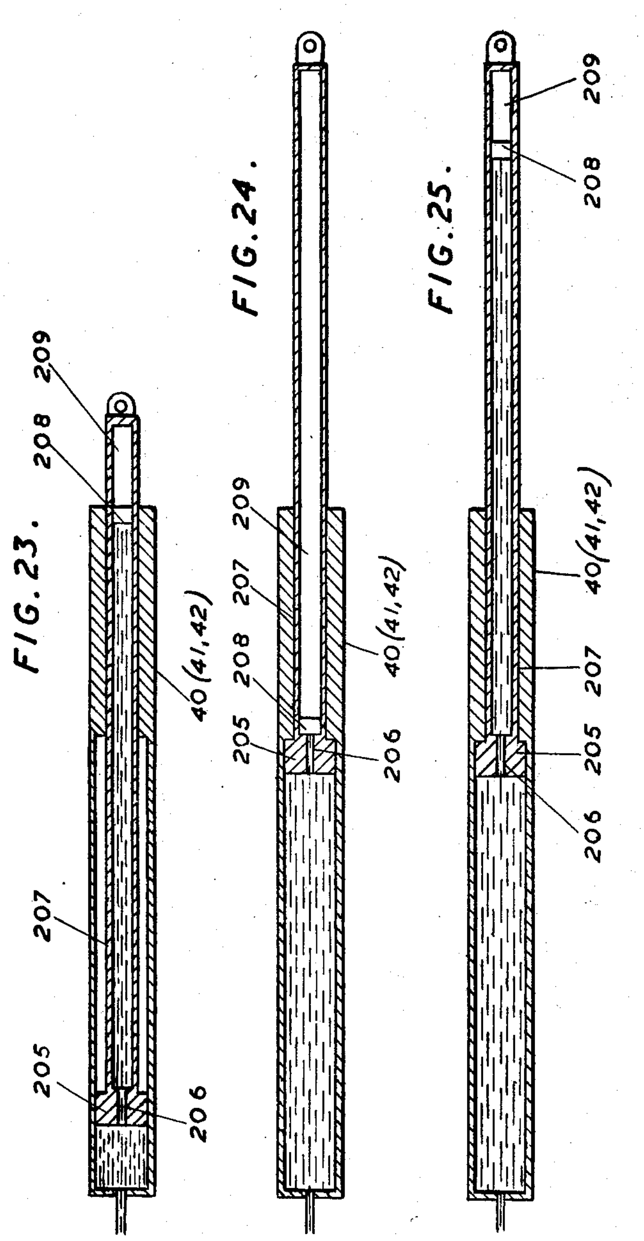
Figs. 23 to 25 are longitudinal sections (somewhat diagrammatic) of the undercarriage strut of Fig. 22, showing three alternative operative configurations.

Each strut 40, 41 or 42, contains a piston 205 with a restricted metering orifice 206 communicating with a hollow piston rod 207 containing a floating piston 208 enclosing an air-cushion space 209 within the rod 207. In the normal or "static" position (Fig. 23), the piston 205 is near the top of the strut, the hollow rod 207 is nearly full of fluid and the floating piston 208 is near the bottom of the rod, the cushioning air in space 209 being compressed. When pressure fluid is admitted above the piston 205 on selecting "jacking," the piston 205 and rod 207 are driven down, extending the strut to the position of Fig. 25. The pressure of the cushioning air 209 remains constant, being that corresponding to the weight supported as in Fig. 23, and the floating piston 208 maintains the same position in the rod 207. On becoming airborne from the jacked position the pilot must select "lowering" to allow the air pressure in the cushioning space 209 to return the floating piston to the top of the rod 207 and empty the rod 207 of fluid, as shown in Fig. 24, the fluid thus expelled being returned to the header tank 191 through the return line 200. Before landing the pilot must select "neutral" to enable the strut to function as a shock absorber in the usual way on landing, in the course of which the strut collapses from the position of Fig. 24 to that of Fig. 23, the passage of the fluid through the metering orifice 206 providing the damping and the resilience being provided by compression of the cushioning air in space 209 between the floating piston 208 and the bottom of the rod 207. In a normal take-off from the "static" position of Fig. 23 with selector valve at "neutral" the strut extends from the position of Fig. 23 to that of Fig. 24 as the cushioning air in space 209 expands on the aircraft becoming airborne.

What I claim is:

1. A rotary-wing aircraft having three sustaining motors with separate axes defining the vertices of a triangle in plan, the center of gravity of the aircraft being toward the center of said triangle, the axes of two of said rotors being in lateral side-by-side relation, one on each side of the longitudinal vertical plane of the craft, and the axis of the third of said rotors being substantially in said plane, each of said rotors having collective pitch varying means; and a control system including a control member mounted with freedom for movement in two senses, and linkage interconnecting said member and said pitch varying means responsive to movement of the member in the first of said senses to operate the pitch varying means of said two side-by-side rotors in opposite directions for controlling roll, and responsive to movement of said member in the second of said senses to operate the pitch varying means of said two rotors in the same direction and simultaneously operate the pitch varying means of the third rotor in the opposite direction for pitching control of the aircraft, wherein at least one of said rotors has a mounting providing for tilting of the rotor whereby to effect trimming of the aircraft without utilizing the pitch varying means.

2. The construction of claim 1 wherein such mounting is provided for each of said side-by-side rotors.

3. The construction of claim 2 wherein such mounting comprises a tilting trunnion, said trunnions for said two side-by-side rotors having their axes so disposed that, when projected on the plane of a circle containing the rotor centers, said axes are substantially radial of said circle.

4. The construction of claim 3, together with a trimming control coupled to tilt both of said side-by-side rotors about the axes of said trunnions so that their displacements are in the same sense when projected on the pitching plane.

5. The construction of claim 3 together with transmission shafts for the three rotors radiating from a center of power distribution, the trunnion axes of said side-by-side rotors coinciding with the axes of the transmission shafts for said rotors.

6. The aircraft of claim 5 embodying a neutralizing construction acting to prevent the torque reaction of the drive of said rotors from being transmitted through the controls to the pilot.

7. A rotary-wing aircraft having three sustaining rotors with separate axes defining the vertices of a triangle, in plan, the center of gravity of the aircraft being toward the center of said triangle, the axes of two of said rotors being in lateral side-by-side relation, one on each side of the longitudinal vertical plane of the craft, and the axis of the third of said rotors being substantially in said plane, each of said rotors having blades with pivot means mounting them for vertical swinging and also having collective blade pitch varying means; and a control system including a control member mounted with freedom for movement in a transverse sense and in a fore-and-aft sense, a rocking structure mounted for universal tilting and coupled to the collective pitch varying means of all three rotors, first linkage interconnecting said member and said structure and coupled to tilt the latter transversely in response to movement of the control member in the transverse sense whereby the pitch varying means of said two side-by-side rotors are operated in opposite directions, in corresponding sense with the movement of said control member, so as to effect instinctive control in roll, and second linkage interconnecting said member and said structure and coupled to tilt the latter in the fore-and-aft sense in response to movement of said control member in the fore-and-aft sense whereby the pitch varying means of said two rotors are operated together in one direction and simultaneously the pitch varying means of the third rotor is operated in the opposite direction so as to effect instinctive pitching control of the aircraft in corresponding sense with the movement of said control member.

8. The construction of claim 7 wherein said three rotors are essentially similar in respect of diameter, number and form of blades, and driven R. P. M.

9. An aircraft according to claim 7, wherein, for at least one of said rotors, there is a tilting member having a pivot assembly about which it tilts in one plane only, the rotor blades being coupled to said member for rocking thereby in a sense to alter their effective pitch angles cyclically at a predetermined azimuth effective to produce a yawing moment on the aircraft, a yawing control organ mounted for movement by the pilot, and interconnections between said organ and said tilting member to effect tilting thereof and thus alteration of said effective pitch angles cyclically at said azimuth.

10. An aircraft according to claim 9 wherein each of the two side-by-side rotors is provided with a tilting member as defined, and further wherein the interconnections between the pilot's yawing control organ and the tilting members for the two rotors are inclusive of an element with oppositely-acting linkages connecting it to said two tilting members, whereby an actuation of the pilot's yawing control organ effects displacement of the lift vectors of said two rotors equally and oppositely in the pitching plane.

C. G. PULLIN.

References Cited in the file of this patent

UNITED STATES PATENTS

| Number | Name | Date |
|---|---|---|
| 1,350,982 | Beurrier et al. | Aug. 24, 1920 |
| 1,783,011 | Florine | Nov. 25, 1930 |
| 1,783,458 | Windsor | Dec. 2, 1930 |
| 1,842,250 | Bobrovsky | Jan. 19, 1932 |
| 1,844,786 | Nelson | Feb. 9, 1932 |
| 2,233,747 | Riedl | Mar. 4, 1941 |
| 2,318,260 | Sikorsky | May 4, 1943 |
| 2,321,572 | Campbell | June 15, 1943 |
| 2,337,570 | Pullin | Dec. 28, 1943 |
| 2,360,988 | Thomas | Oct. 24, 1944 |
| 2,390,334 | Snarey | Dec. 4, 1945 |

FOREIGN PATENTS

| Number | Country | Date |
|---|---|---|
| 25,378 | Great Britain | 1903 |
| 637,938 | France | Feb. 13, 1928 |